United States Patent [19]
Oyama et al.

[11] Patent Number: 5,808,708
[45] Date of Patent: Sep. 15, 1998

[54] LIGHTING APPARATUS

[75] Inventors: Hisashi Oyama, Nara; Youko Ohta, Kashiba; Kenichi Ukai, Uda-gun; Nobuyuki Takahashi, Kawachinagano; Takayoshi Tanabe; Hirohide Terasaki, both of Tenri, all of Japan

[73] Assignee: Sharp Kabushiki Kaisha, Osaka, Japan

[21] Appl. No.: 573,498

[22] Filed: Dec. 14, 1995

[30] Foreign Application Priority Data

| Dec. 15, 1994 | [JP] | Japan | 6-311574 |
| Jan. 27, 1995 | [JP] | Japan | 7-012027 |
| Jan. 27, 1995 | [JP] | Japan | 7-012029 |

[51] Int. Cl.$^6$ ............ G02F 1/1335; G02B 6/00
[52] U.S. Cl. .......... 349/65; 349/62; 349/67; 385/129; 385/901; 362/31
[58] Field of Search ............ 349/64, 65, 61, 349/62, 70; 362/31, 32, 26; 385/129, 146, 901, 130, 131

[56] References Cited

U.S. PATENT DOCUMENTS

| 5,064,276 | 11/1991 | Endo et al. | 349/65 |
| 5,202,950 | 4/1993 | Arego et al. | 349/65 |
| 5,489,999 | 2/1996 | Matsumoto | 349/58 |
| 5,561,539 | 10/1996 | Funahata et al. | 349/56 |

FOREIGN PATENT DOCUMENTS

| 5-53111 | 3/1993 | Japan . | |
| 5-88166 | 4/1993 | Japan . | |
| 5-249320 | 9/1993 | Japan | 349/62 |
| 5-249459 | 9/1993 | Japan . | |

*Primary Examiner*—Hung X. Dang
*Assistant Examiner*—Tai V. Duong
*Attorney, Agent, or Firm*—David G. Conlin; Peter F. Corless; Dike, Bronstein, Roberts & Cushman, LLP

[57] ABSTRACT

A lighting apparatus for irradiating a liquid crystal display panel from the back includes a light guiding plate having at least an end which is bent in a direction opposite to the liquid crystal display panel, and a light source disposed on the back surface of the light guiding plate with respect to the liquid crystal display panel. Light from the light source is incident on the bent section of the light guiding plate, reflected by a reflector covering the outside surface of the bent section, and then falls on a section corresponding to a data display space of the liquid crystal display panel. This structure enables an increase in the ratio of the area of a light emitting section to the area of the entire lighting apparatus.

28 Claims, 27 Drawing Sheets

LIGHTING APPARATUS

FIELD OF THE INVENTION

The present invention relates to a display device such as a liquid crystal display device having a light transmitting display screen and a lighting apparatus which is to be incorporated into the display device so as to light the display screen from the back, and more particularly to an edge-light type lighting apparatus having a light source arranged at an end section of a light guiding plate.

BACKGROUND OF THE INVENTION

Regarding a lighting apparatus which irradiates a liquid crystal display panel from the back in a liquid crystal display device, a direct lighting apparatus having a plurality of light sources at the back of the liquid crystal panel and an edge-light type lighting apparatus having a light source at an end of a light guiding plate are known.

In general, the direct lighting apparatus has smaller outside dimensions than the edge-light type lighting apparatus, but suffers from such drawbacks that (1) reducing the thickness is difficult, (2) luminance spots tend to appear, and (3) the structure is complicated. For this reason, in recent years, the edge-light type lighting apparatus is used more than the direct lighting apparatus.

As illustrated in FIG. 26, the edge-light type lighting apparatus includes a light guiding plate 102, and light sources 101 which are disposed on both ends of the light guiding plate 102. Therefore, light emitted by the light source 101 strikes light-incidence end surface 102a and enters into the light guiding plate 102. The incident light is guided into the light guiding plate 102 while being reflected by a reflecting sheet 104 which is placed on the back surface of the light guiding plate 102, and is emitted toward a liquid crystal display panel (not shown) through a diffusing sheet 103 placed on the top surface of the light guiding plate 102. An area indicated by the arrows in FIG. 27 shows a region of the liquid crystal display panel where data is displayed. This region is hereinafter referred to as data display space R. Additionally, a portion of the light guiding plate 102 which irradiates light on the data display space R is a data display space corresponding section (hereinafter simply referred to as the corresponding section) 102b.

In the above-mentioned structure of the edge-light type lighting apparatus, if the light source 101 and the light guiding plate 102 are disposed close to each other, the end portion of the light guiding plate 102 and the vicinity thereof are irradiated more strongly and become brighter than the central portion. This may cause luminance spots.

In order to prevent the luminance spots from spreading to the corresponding section 102b, it is necessary to ensure a distance between the light source 101 and the corresponding section 102b to be not less than 3 mm.

However, if such a lighting apparatus in which the light source 101 and the corresponding section 102b of the light guiding plate 102 are disposed distantly is incorporated into a liquid crystal display device, the area of portions other than the portion irradiating the data display space R of the liquid crystal display panel becomes larger. This causes a problem that the outside area of the liquid crystal display device with respect to the area of the data display space R becomes larger.

Meanwhile, for example, a lighting apparatus which prevents the luminance spots from appearing on the light guiding plate 102 is disclosed in Japanese Publication for Unexamined Patent Application No. 88166/1993 (Tokukaihei 5-88166). In this lighting apparatus, as illustrated in FIG. 27, the light-incidence end surface 102a of the light guiding plate 102 is made a convex surface having a curved profile like an arc of circle, and light that moves toward the vicinity of the end portion of the light guiding plate 102 is refracted using the effect of a convex lens so that the light moves toward the center portion. With this arrangement, the lighting apparatus can prevent the end portion of the light guiding plate 102 from becoming brighter than the central portion with the irradiation of the light from the light source 101, and luminance spots from being generated.

Compared to the former structure, this structure shortens the distance between the light source 101 and the corresponding section 102b of the light guiding plate 102 to some degrees. However, since the light sources 101 and the light guiding plate 102 are arranged on the same plane, the outside dimensions of the whole lighting apparatus become larger than the dimensions of the liquid crystal display panel (not shown) by an amount corresponding to the sizes of the light sources 101. Consequently, if such a lighting apparatus is incorporated into a liquid crystal display device, it becomes difficult to decrease the outside dimensions of the liquid crystal display device with respect to the area of the data display space to a desired level.

In addition, for example, Japanese Publication for Unexamined Patent Application No. 53111/1993 (Tokukaihei 5-53111) discloses a liquid crystal display device. In this liquid crystal display device, as illustrated in FIG. 28, the plate thickness of the corresponding section 102b of the light guiding plate 102 is thinner than that of the light-incidence end surface 102a, and the plate thickness of the light-incidence end surface 102a is substantially equal to the tube diameter of the light source 101. Furthermore, Japanese Publication for Unexamined Patent Application No. 249459/1993 (Tokukaihei 5-249459) discloses a liquid crystal display device. In the structure of this liquid crystal display device, as illustrated in FIG. 29, each of the light sources 101 is disposed on the front surface of the end portion of the light guiding plate 102 and the liquid crystal display panel 106 is buried in a recessed portion 102c of the light guiding plate 102 so as to prevent the light from the light source 101 from affecting the area of the plane of incidence even when the thickness of the light guiding plate 102 is reduced.

However, although the structures of these disclosed liquid crystal display devices enable a decrease in the thickness of the liquid crystal display device by reducing the thickness of the light guiding plate 102, it is impossible to decrease the outside dimensions of the liquid crystal display device with respect to the area of data display space.

SUMMARY OF THE INVENTION

An object of the present invention is to provide a lighting apparatus in which the ratio of the area of a light emitting section to the total area of the apparatus is high. Another object of the present invention is to reduce the outside dimensions of the entire apparatus with respect to the area of a data display space of a display device by incorporating such a lighting apparatus into the display device.

In order to achieve the above objects, a lighting apparatus of the present invention includes:

a light emitting section in the shape of a flat plate having a light emitting surface on one side, the light emitting section being made from a light transmitting material;

a light source disposed on a side of the light emitting section opposite to the light emitting surface; and a light guiding section for guiding light from the light source into the light emitting section through a side surface of the light emitting section.

With this structure, the light guiding section can guide the light from the light source disposed on the back surface of the light emitting section to the side surface of the light emitting section and make the light incident on the light emitting section through the side surface. Namely, by disposing the light source, which is arranged along the side surface of the light emitting section in a prior art, on the back surface of the light emitting section, it is possible to reduce the area of the entire apparatus with respect to the area of the light emitting section. As a result, a lighting apparatus in which the ratio of the area of the light emitting section to the total area of the apparatus is high can be provided.

Moreover, in this lighting apparatus, the light guiding section includes:

a light transmitting section formed by a light transmitting material so as to lie in a bent shape from the side surface of the light emitting section to a position facing the light source; and a light-incidence end surface at a position of the light guiding section facing the light source, the light-incidence end surface being a plane substantially perpendicular to a surface opposite to the light emitting surface of the light emitting section but slightly tilts with respect to the surface opposite to the light emitting surface so that the plane is separated from the light source by a greater distance at a more distant point from the surface opposite to the light emitting surface.

With this structure, it is possible to reduce the light from the light source disposed on the back surface of the light emitting section from being emitted from the vicinity of an end section of the light emitting section near the light source, thereby decreasing the generation of bright lines. As a result, since a portion which is shielded from light in the prior art for the bright lines can be used as the light emitting section, it is possible to provide a lighting apparatus in which the ratio of the area of the light emitting section with respect to the total area of the apparatus is high.

Furthermore, a display device having a light-transmitting-type image display panel and a lighting apparatus for irradiating the image display panel from the back, includes:

a light source; and a light guiding member including a light emitting section in the shape of a flat plate having a surface whose size is substantially equal to the size of an image display space of the image display panel, and a light guiding section for guiding light from the light source to be incident on a side surface of the light emitting section, wherein the light source is disposed on the back surface of the light emitting section of the light guiding member with respect to the image display panel so that at least a part of the light source is located in a position closer to the center of the light emitting section than to an edge of the light emitting section.

By disposing the light source on the back surface of the light emitting section in the shape of a flat plate having a surface whose size is substantially equal to the size of the image display panel and by causing the light guiding section to guide the light from the light source to the side surface of the light emitting section for emitting the light, it is possible to reduce the area of portions other than the image display space with respect to the total area of the device.

For a fuller understanding of the nature and advantages of the invention, reference should be made to the ensuing detailed description taken in conjunction with the accompanying drawings.

DESCRIPTION OF THE PREFERRED EMBODIMENTS

[Embodiment 1]

The following description will discuss one embodiment of the present invention with reference to FIGS. 1 to 5.

Figure 1:
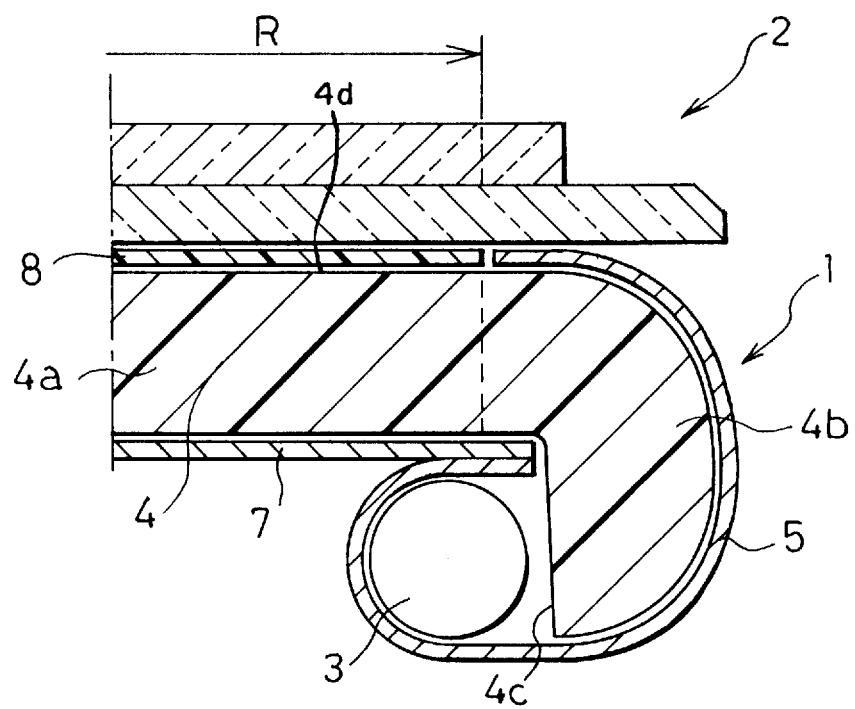
FIG. 1 is a schematic cross section showing the structure of a liquid crystal display device incorporating a lighting apparatus according to one embodiment of the present invention.

As illustrated in FIG. 1, a flat light source device 1 as a lighting apparatus of this embodiment for use in a liquid crystal display device is disposed behind the back surface of the flat liquid crystal display panel 2, and irradiates the liquid crystal display panel 2 from the back.

Figure 2:
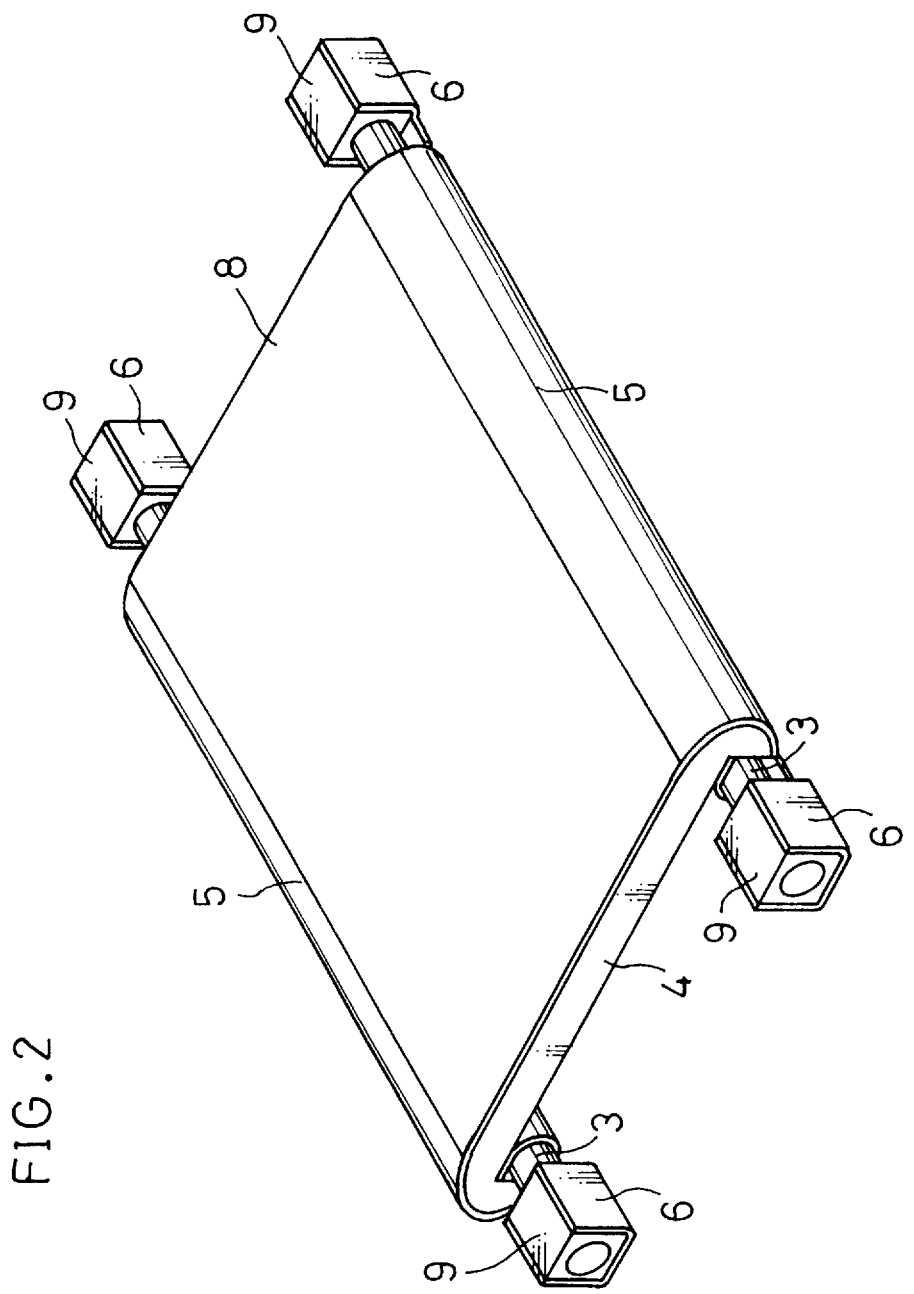
FIG. 2 is a perspective view showing the outer appearance of the lighting apparatus.

The flat light source device 1 has an outer appearance shown in FIG. 2, and mainly includes two light sources 3, a light guiding plate 4 for guiding light from the light sources 3, and two reflectors 5. The reflector 5 reflects the light from the light source 3 so that the light falls on the light guiding plate 4 efficiently.

The light source 3 is a linear light source, for example, a fluorescent tube, which is similar to a light source used in a conventional edge-light type lighting apparatus for a liquid crystal display device.

The light guiding plate 4 is formed into the shape of a substantially flat plate by a material having high transmissivity with respect to every range of wavelength, for example, a transparent acrylic resin. As illustrated in FIGS. 1 and 2, an end portion of the light guiding plate 4 near the light source 3 is curved downward so as to have a substantially semicircular profile. The position at which the end portion is bent is located outside of the data display space R of the light crystal display panel 2 above the light guiding plate 4. In the light guiding plate 4, a flat plate portion corresponding to the data display space R is a data display space corresponding section (hereinafter just referred to as the corresponding section) 4a. Similarly, the bent end portion is a non-data-display space corresponding section (hereinafter referred to as the non-corresponding section) 4b.

The bent portion of the non-corresponding section 4b has a light-incidence end surface 4c perpendicular to the liquid crystal display panel 2. The light source 3 is disposed behind the back surface of the light guiding plate 4 to face the light-incidence end surface 4c. Consequently, the light from the light source 3 falls on the light guiding plate 4 through the light-incidence end surface 4c.

Figure 4:
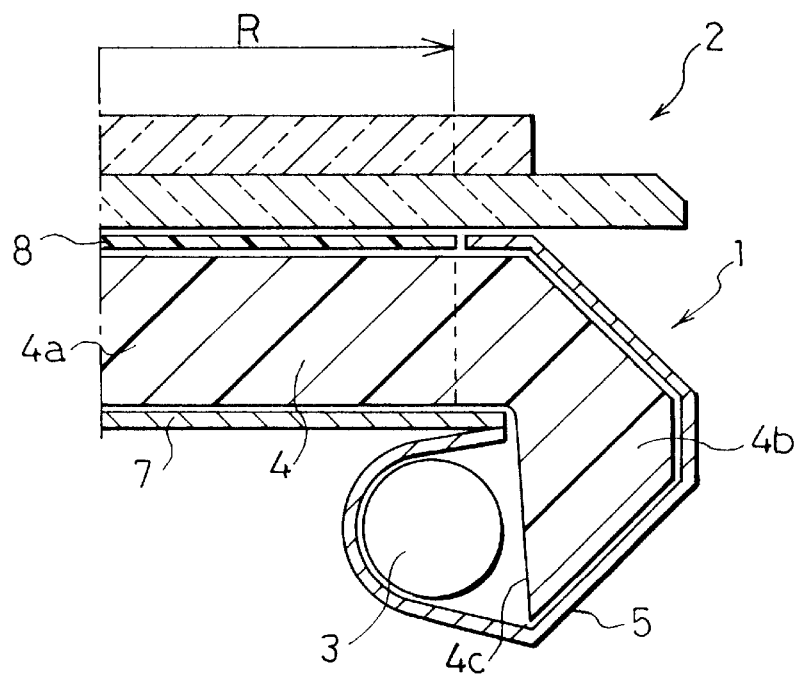
FIG. 4 is a schematic cross section showing the structure of a liquid crystal display device incorporating a lighting apparatus as another modified example of the liquid crystal display device of FIG. 1.
Figure 5:
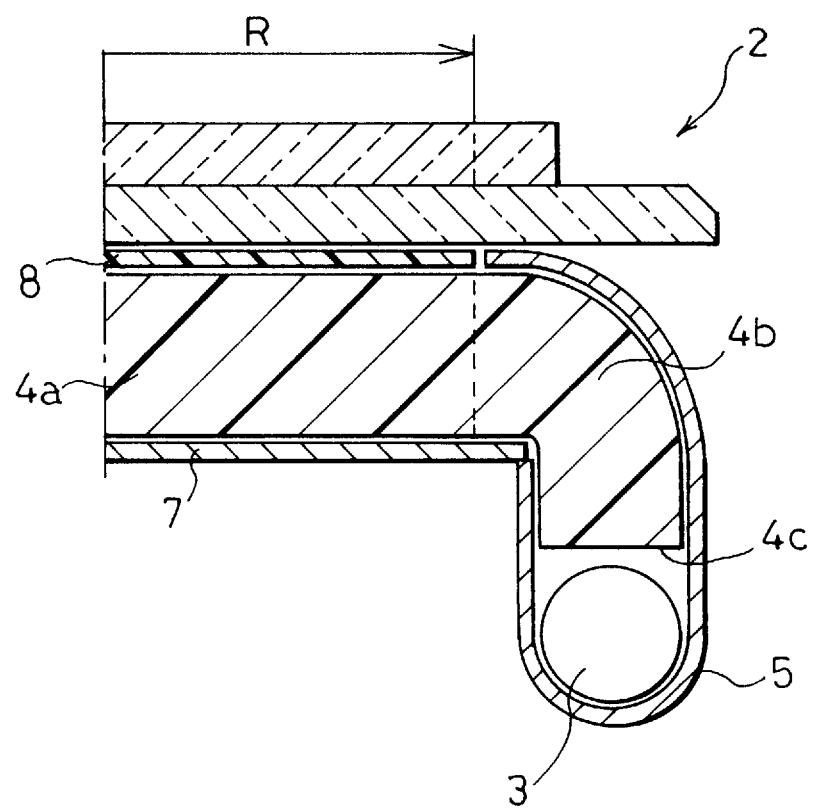
FIG. 5 is a schematic cross section showing the structure of a liquid crystal display device incorporating a lighting apparatus as still another modified example of the liquid crystal display device of FIG. 1.

With respect to the shape of the non-corresponding section 4b of the light guiding plate 4 near the light source 3, it may have a substantially trapezoid profile as shown in FIG. 4. Alternatively, as illustrated in FIG. 5, the non-corresponding section 4b may be simply bent downward so that the light-incidence end surface 4c becomes parallel to the liquid crystal display panel 2. Namely, the non-corresponding section 4b is preferably formed into such a shape that efficiently guides the light from the light source 3 behind the back surface of the liquid crystal display panel 2 to the corresponding section 4a of the light guiding plate 4.

The reflector 5 is formed by a metal, or film or plastic on which a metal is deposited. The reflector 5 extends to a position just before the data display space R of the liquid crystal display panel 2 and is fixed on the light guiding plate 4 so as to cover the periphery of the light source 3 except a side facing the light-incidence end surface 4c of the light guiding plate 4, and the non-corresponding section 4b of the light guiding plate 4.

Electrode holding members 6 shown in FIG. 2 are integrally formed on both ends of the reflector 5 in its longitudinal direction. The light source 3 is fixed to the electrode holding members 6 by silicon holders 9 which are fitted into the electrode sections on both ends of the light source 3.

In order to effectively irradiate the liquid crystal display panel 2, a back reflector 7 is disposed on the back surface of the light guiding plate 4, and a diffusing sheet 8 is placed between the light guiding plate 4 and the liquid crystal display panel 2. The back reflector 7 reflects leakage light from the back surface of the light guiding plate 4 back into the light guiding plate 4.

The following description will discuss the movement of the light in the light guiding plate 4.

The light emitted by the light source 3 goes through the light-incidence end surface 4c of the light guiding plate 4 and enters into the corresponding section 4b thereof. At this time, the light incident at an incident angle not smaller than a critical angle (42.1 degrees in this embodiment) moves toward the corresponding section 4a of the light guiding plate 4 through the non-corresponding section 4b while being totally reflected repeatedly. On the other hand, the light incident at an incident angle smaller than the critical angle is once emitted from the light guiding plate 4 through the non-corresponding section 4b. Therefore, in order to return the light into the light guiding plate 4, it is necessary to provide, for example, a reflecting film. In this embodiment, however, since the reflector 5 of the light source 3 extends to the periphery of the non-corresponding section 4b of the light guiding plate 4, there is no need to newly provide a reflecting film.

In order to prevent the appearance of luminance spots, it is necessary to use, for example, a light blocking film for blocking light among the light emitted by the light source, which directly moves toward the corresponding section 4a of the light guiding plate 4. In this embodiment, the reflector 5 covers the periphery of the light source 3 except a portion facing the light-incidence end surface 4c, and thereby functioning as the light blocking film.

The light which has reached the corresponding section 4a of the light guiding plate 4 is emitted from a light emitting surface 4d of the corresponding section 4a by total reflection in the light guiding plate 4 and reflection on the back reflector 7 disposed on the back surface of the light guiding plate 4. The light emitted from the light emitting surface 4d is diffused by the diffusing sheet 8 and uniformly irradiates the liquid crystal display panel 2.

In this embodiment, when the reflector 5 is formed by a metal, it is possible to produce a radiating effect in the electrode sections, and reduce the number of members and the cost by forming the reflector 5 using the same material as the electrode holding members 6 of the light source 3. In addition, when the amount of heat generated in the electrode sections of the light source 3 is small, the efficiency of using the light can be easily improved by making the reflector 5 from a highly reflective white-color resin such as a titanium-containing synthetic resin and polycarbonate.

Figure 3:
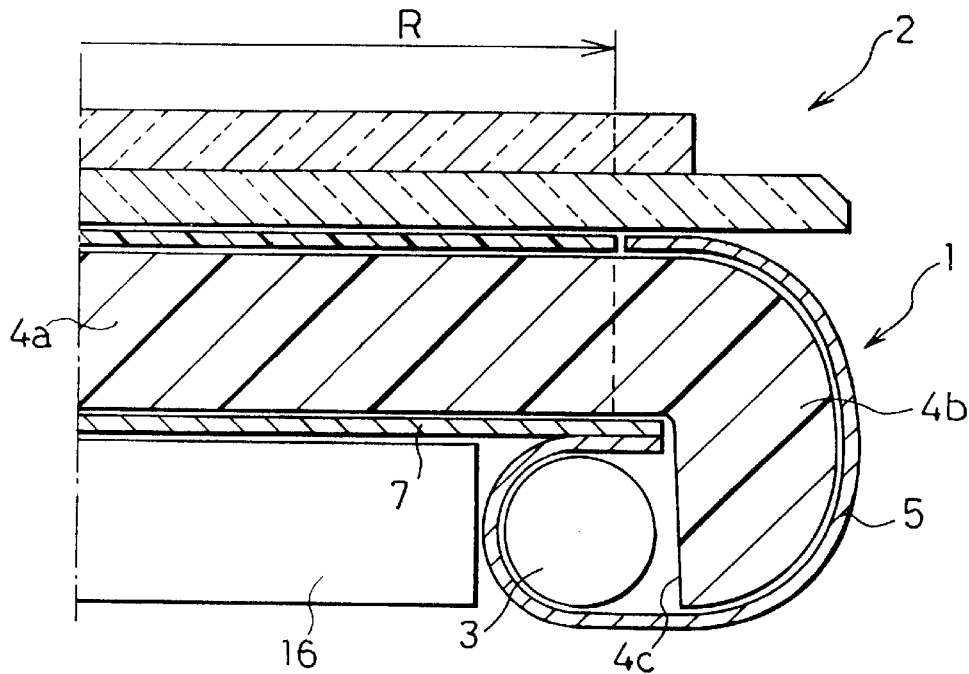
FIG. 3 is a schematic cross section showing the structure of a liquid crystal display device incorporating a lighting apparatus as a modified example of the liquid crystal display device of FIG. 1.

Furthermore, it is possible to reduce the thickness of the panel by disposing a driving circuit of liquid crystals and a light source control circuit 16 on the back surface of the light guiding plate 4 as illustrated in FIG. 3.

[Embodiment 2]

The following description will discuss another embodiment of the present invention with reference to FIGS. 6 to 10. The structures having the same function as in Embodiment 1 will be designated by the same code and their description will be omitted.

Figure 6:
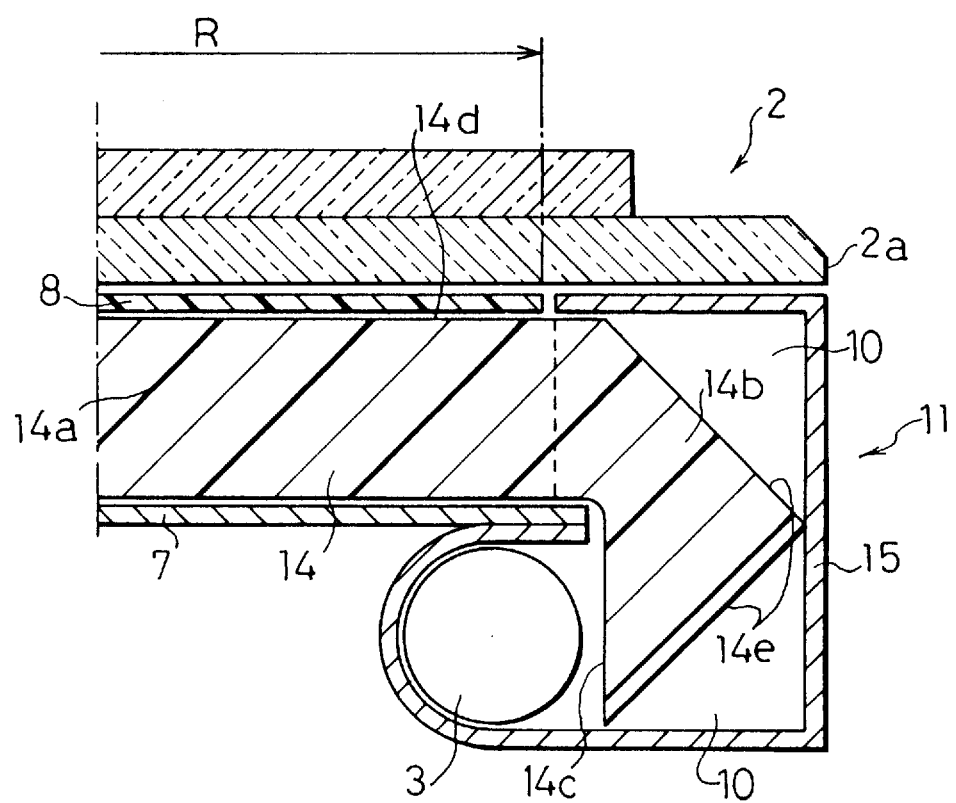
FIG. 6 is a schematic cross section showing the structure of a liquid crystal display device incorporating a lighting apparatus according to another embodiment of the present invention.

A plane light source device 11 as a lighting apparatus of this embodiment for use in a liquid crystal display device is disposed behind the back surface of the flat liquid crystal panel 2 as shown in FIG. 6 to irradiate the liquid crystal panel 2 from the back.

Figure 7:
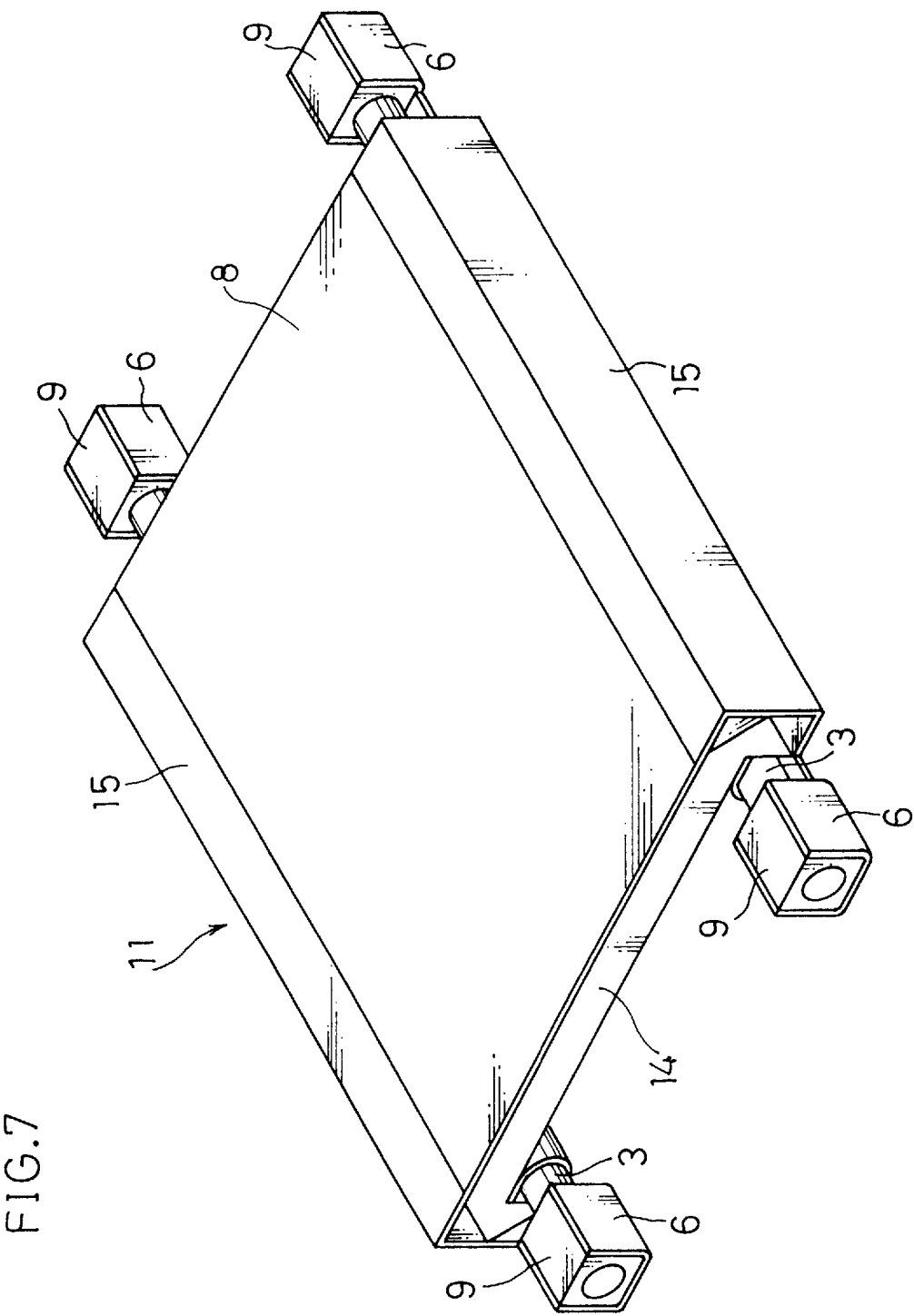
FIG. 7 is a perspective view showing the outer appearance of the lighting apparatus.

The plane light source device 11 has an outer appearance shown in FIG. 7, and mainly includes two light sources 3, a light guiding plate 14 for guiding light from the light sources 3, and two reflectors 15. Each reflector 15 reflects the light from each light source 3 so that the light falls on the light guiding plate 14 efficiently.

The light source 3 is a linear light source, for example, a fluorescent tube, which is similar to a light source used in a conventional edge-light type lighting apparatus for a liquid crystal display device.

The light guiding plate 14 is formed into the shape of a substantially flat plate by a material having high transmissivity with respect to every range of wavelength, for example, a transparent acrylic resin. As illustrated in FIGS. 6 and 7, each of the end portions of the light guiding plate 14 near the light sources 3 is bent downward so as to have a substantially triangular profile. The position at which the end portion is bent is located outside of the data display space R of the liquid crystal display panel 2 above the light guiding plate 14. In the light guiding plate 14, an inner flat plate portion corresponding to the data display space R is a data display space corresponding section (hereinafter just referred to as the corresponding section) 14a. Similarly, the bent end portion is a non-data-display space corresponding section (hereinafter referred to as the non-corresponding section) 14b.

The inner end surface of the bent portion of the non-corresponding section 14b is a light-incidence end surface 14c of the light guiding plate 14. The light source 3 is arranged on the back surface of the light guiding plate 14 to face the light-incidence end surface 14c. The light-incidence end surface 14c is perpendicular to the corresponding section 14a in the shape of a flat plate.

The light guiding plate 14 is formed so that the thickness of the flat plate portion as the corresponding section 14a is thicker than that of a portion having the light-incidence end surface 14c of the non-corresponding section 14b is formed. The thickness of the latter portion is preferably substantially equal to the tube diameter of the light source 3 from the viewpoint of the effective use of the light from the light source 3.

As illustrated in FIG. 6, the bent portion of the non-corresponding section 14b has the shape of a substantially isosceles triangle with outer end surfaces 14e as two equal sides in profile. The angle between the outer end surfaces 14e (the vertical angle of the isosceles triangle) is about 90 degrees. With this arrangement, since the light which has fallen on the light-incidence end surface 14c at a right angle from the light source 3 strikes the inside surface of the outer end surface 14e at an incident angle of substantially 45 degrees, it is totally reflected and guided to the non-corresponding section 14b. Thus, among the light emitted by the light source 3, more light is totally reflected by the non-corresponding section 14b of the light guiding plate 14, thereby improving the efficiency of guiding light to the light guiding plate 14.

The reflector 15 is formed by a metal, and extends to a position just before the data display space R of the liquid crystal display panel 2 and is fixed on the light guiding plate 14 so as to cover the periphery of the light source 3 except a side facing the light-incidence end surface 14c of the light guiding plate 14, and the non-corresponding section 14b thereof. Formed between the outer end surfaces 14e of the non-corresponding section 14b and the reflector 15 are spatial sections 10.

The interior angle of the portion of the reflector 15 where the spatial section 10 is formed is arranged to be about 90 degrees. With this arrangement, it is possible to reflect the light emitted from the non-corresponding section 14b of the light guiding plate 14 in a direction parallel to the incident direction by the reflecting surface of the reflector 15 without changing the angle of incidence and reflection. It is thus possible to reduce the light from being directly reflected by the reflector 15. Consequently, it is possible to reduce light which produces bright lines. Since it is possible to reduce the light from falling on the vicinity of the boundary section between the light emitting surface 14d and the non-corresponding section 14b of the light guiding plate 14 at an angle less than the critical angle, the light from the light source 3 can be effectively guided into the light guiding plate 14.

Electrode holding members 6 shown in FIG. 7 are integrally formed on both ends of the reflector 15 in its longitudinal direction. The light source 3 is fixed to the electrode holding members 6 by the silicon holders 9 which are fitted into the electrode sections on both ends of the light source 3.

In order to reflect the leakage light from the back surface of the light guiding plate 14, the back reflector 7 is disposed on the back surface of the light guiding plate 14 as shown in FIG. 6. The diffusing sheet 8 for diffusing the light emitted from the light emitting surface 14d is placed on the light emitting surface 14d of the light guiding plate 14.

Referring now to FIG. 6, the following description will discuss the movement of the light in the light guiding plate 14 of the above-mentioned plane light source device 11.

The light emitted by the light source 3 goes through the light-incidence end surface 14c of the light guiding plate 14 and enters into the inside surface of the outer end surface 14e of the non-corresponding section 14b thereof. At this time, the light incident at an incident angle not smaller than a critical angle (for example, 42.1 degrees) moves toward the corresponding section 14a from the non-corresponding section 14b while being totally reflected repeatedly. On the other hand, the light incident on the outer end surface 14e at an incident angle smaller than the critical angle goes through the outer end surface 14e and is once emitted to the spatial section 10 with a refractive index which is different from the refractive index of the light guiding plate 14. Subsequently, the light is reflected by the reflector 15, moved back into the light guiding plate 14, and advances toward the corresponding section 14a.

The light which has reached the corresponding section 14a of the light guiding plate 14 is emitted from the light emitting surface 14d of the corresponding section 14a by total reflection in the light guiding plate 14 and reflection on the back reflector 7 disposed on the back surface of the light guiding plate 14. The light emitted from the light emitting surface 14d is diffused by the diffusing sheet 8 placed between the liquid crystal display panel 2 and the light guiding plate 14, and substantially uniformly irradiates the liquid crystal display panel 2.

As described above, in the plane light source device 11, both the end portions of the light guiding plate 14 are bent toward the side opposite to the light emitting surface 14d. Moreover, the inner end surface of the bent portion of the light guiding plate 14 is made the light-incidence end surface 14c, and the light source 3 is arranged along the light-incidence end surface 14c. Namely, the light source (light source 3), which causes an increase in the area of portions other than the portion corresponding to the data display space in a conventional lighting apparatus, is disposed on the back surface of the light guiding plate 14. It is thus possible to provide a lighting apparatus in which the ratio of the area occupied by the data display space corresponding section (corresponding section 14a) to the total area is high.

Consequently, by incorporating such a lighting apparatus into a display device, for example, a liquid crystal display device, the outside dimensions of the display device with respect to the area of the data display space of the display device can be decreased. Namely, the display device can have smaller outside dimensions compared to a conventional display device having a data display space of the same area.

The following description will discuss the effect produced by the spatial sections 10 with reference to a comparable example.

Figure 10:
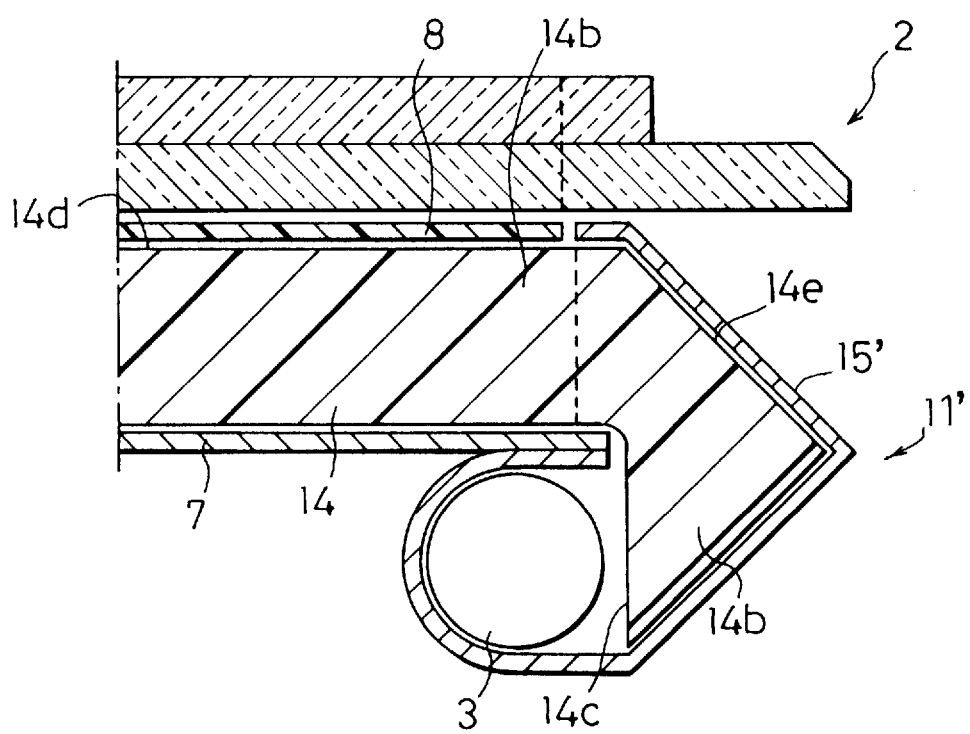
FIG. 10 is a schematic cross section of the lighting apparatus as the comparable example of the present invention.

As a lighting apparatus which enables a reduction in the outside dimensions of the display device by bending the non-corresponding section 14b of the light guiding plate 14, a plane light source device 11' shown in FIG. 10 will be given as a comparable example. The plane light source device 11' uses a reflector 15' instead of the reflector 15 in the plane light source device 11 shown in FIG. 6. The reflector 15' is formed along the outer end surface 14e of the non-corresponding section 14b with no space like the spatial section 10 between the outer end surface 14e and the reflector 15'.

However, in the structure of the plane light source device 11', as illustrated in FIG. 9(a), light L' which falls on the light emitting surface 14d of the light guiding plate 14 in the vicinity of the boundary between the corresponding section 14a and the non-corresponding section 14b at an incident angle smaller than the critical angle is present. As a result, the end portion of the data display space R near the light source 3 becomes brighter than other portions. In other words, a bright line appears at the end portion of the data display space R near the light source 3.

By contrast, in the plane light source device 11 of this embodiment, spatial sections 10 formed by a layer of air is present between the reflector 15 and the light guiding plate 14. FIG. 9(b) shows the light path of light L which has been incident on the outer end surface 14e at the same angle as the light L' and been once emitted from the outer end surface 14e of the non-corresponding section 14b. As illustrated in FIG. 9(b), after the light L was emitted from the non-corresponding section 14b, the course thereof is changed by the spatial section 10 and the reflector 15, and the light L moves toward the corresponding section 14a through a light path which is different from the light path of the light L' which is directly reflected by the outer end surface 14e. Therefore, compared to the plane light source device 11', the plane light source device 11 can reduce the light from falling on the light emitting surface 14d at the boundary section between the corresponding section 14a and the non-corresponding section 14b at an incident angle smaller than the critical angle. Namely, it is possible to reduce the bright lines on the boundary section between the corresponding section 14a and the non-corresponding section 14b of the light guiding plate 14.

As a result, the difference in the brightness between the center section of the corresponding section 14a and the boundary section between the corresponding section 14a and the non-corresponding section 14b is reduced, thereby unifying the in-plane brightness of the corresponding section 14a of the light guiding plate 14.

Moreover, as described above, the plane light source device 11 can reduce the light from being emitted from the boundary section between the corresponding section 14a of the light emitting surface 14d and the non-corresponding section 14b of the light guiding plate 14, and can effectively guide the light to the corresponding section 14a. It is thus possible to improve the brightness of the corresponding section 14a of the light guiding plate 14.

Accordingly, by reducing the bright lines in the plane light source device 11, the in-plane brightness is made uniform, and the display quality of the liquid crystal display device incorporating the plane light source device 11 is improved. In addition, if the allowable level of the bright lines is arranged similar to that in a prior art, since a portion which requires blocking of light in the prior art is usable as the corresponding section, the area of the corresponding section 14a shown in FIG. 6 can further be increased. It is therefore possible to further reduce the outside dimensions of the liquid crystal display device with respect to the area of the data display space R.

Moreover, in the plane light source device 11, the reflector 15 is formed to cover the periphery of the light source 3 except a portion facing the light-incidence end surface 14c of the light guiding plate 14, and the non-corresponding section 14b of the light guiding plate 14. Since the upper part of the light source 3 is covered with the reflector 15, it is possible to prevent the light emitted from the upper part of the light source 3 from directly falling on the corresponding section 14a of the light guiding plate 14. Additionally, since the reflector 15 extends to cover the outer end surface 14e of the non-corresponding section 14b, the light which has fallen on the bent portion 14b of the light-incidence end surface 14c at an incident angle smaller than the critical angle and been emitted once from the outer end surface 14e, is reflected by the reflector 15 through the spatial section 10 and moved back into the light guiding plate 14. It is therefore possible to prevent the appearance of luminance spots due to the direct incidence of light on the corresponding section 14a of the light guiding plate 14, and eliminate the necessity of newly providing a reflecting film on the outer end surface 14e of the bent portion.

Alternatively, it is possible to arrange the plate thickness of the corresponding section 14a of the light guiding plate 14 to be smaller than the height of a portion of the non-corresponding section 14b which protrudes downward from the flat plate portion of the corresponding section 14a. The height is preferably substantially equal to the tube diameter of the light source 3. With this arrangement, it is possible to make the light from the light source 3 efficiently incident on the light guiding plate 14 and reduce the thickness of the device.

In this embodiment, the bent portion of the non-corresponding section 14b of the light guiding plate 14 is arranged to have a substantially triangular profile with a vertical angle of about 90 degrees. However, it is also possible to have a trapezoid or substantially semi-circular profile.

Figure 8:
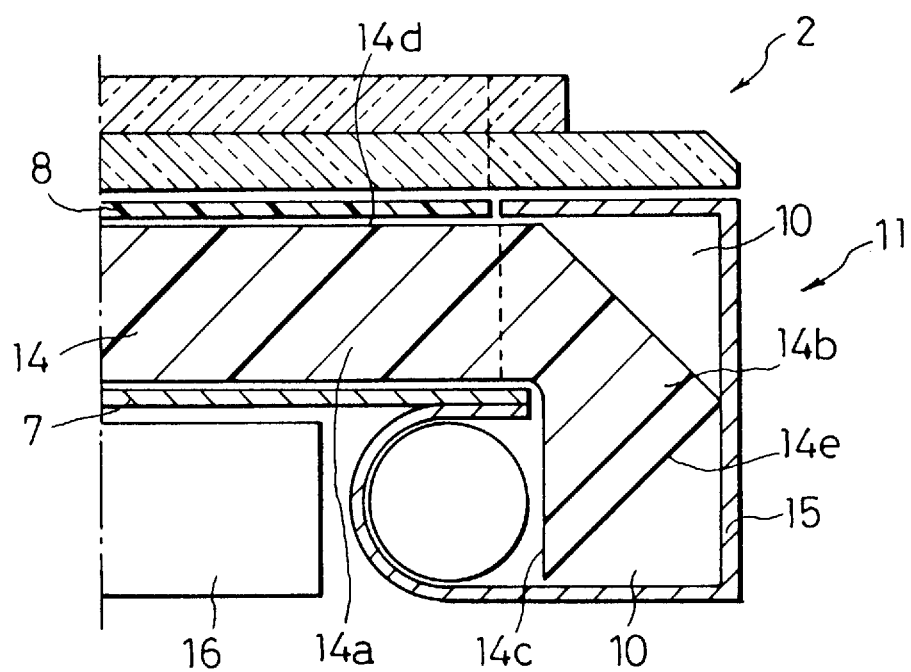
FIG. 8 is a schematic cross section showing the structure of a liquid crystal display device incorporating a lighting apparatus as a modified example of the liquid crystal display device of FIG. 6.
Figure 9:
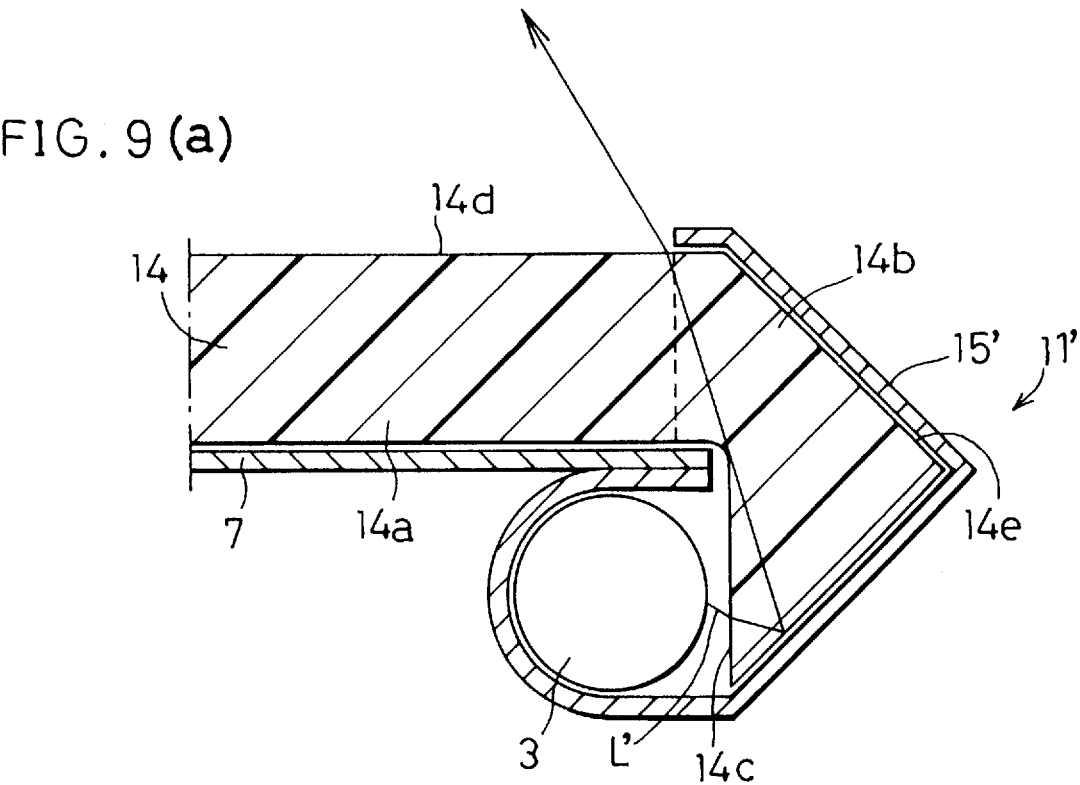
FIG. 9($a$) is a view explaining the movement of light in a lighting apparatus as a comparable example of the present invention, in which a reflector is formed along the periphery of a bent section of a light guiding plate, and FIG. 9($b$) is a view explaining the movement of light in the lighting apparatus of the present invention, in which a space is formed between a reflector and a bent section of a light guiding plate.
Figure 9:
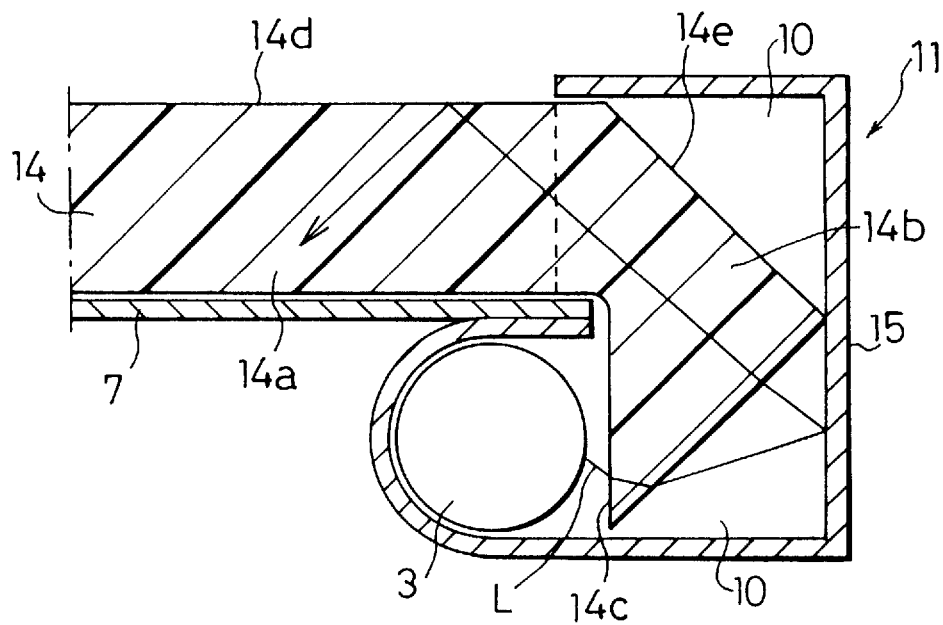

Moreover, as illustrated in FIG. 8, by disposing a driving circuit of liquid crystals and the control circuit 16 for controlling the light source 3 on the back surface of the light guiding plate 14, the space on the back surface of the light guiding plate 14 can be effectively used, thereby reducing the thickness of the liquid crystal display device. Furthermore, in this embodiment, the reflectance of the reflector 15 is not particularly mentioned. However, by forming the reflector 15 from a highly reflecting mirror surface, light irradiated on the reflector 15 is not diffused when reflected. This arrangement eliminates the leakage of light from the boundary surface between the light guiding plate 14 and the reflector 15. As a result, the light from the light source can be efficiently guided to the light guiding plate 14.

[Embodiment 3]

The following description will discuss another embodiment of the present invention with reference to FIGS. 11 to 18. The members having the same function as in the above-mentioned embodiments will be designated by the same code and their description will be omitted.

Figure 11:
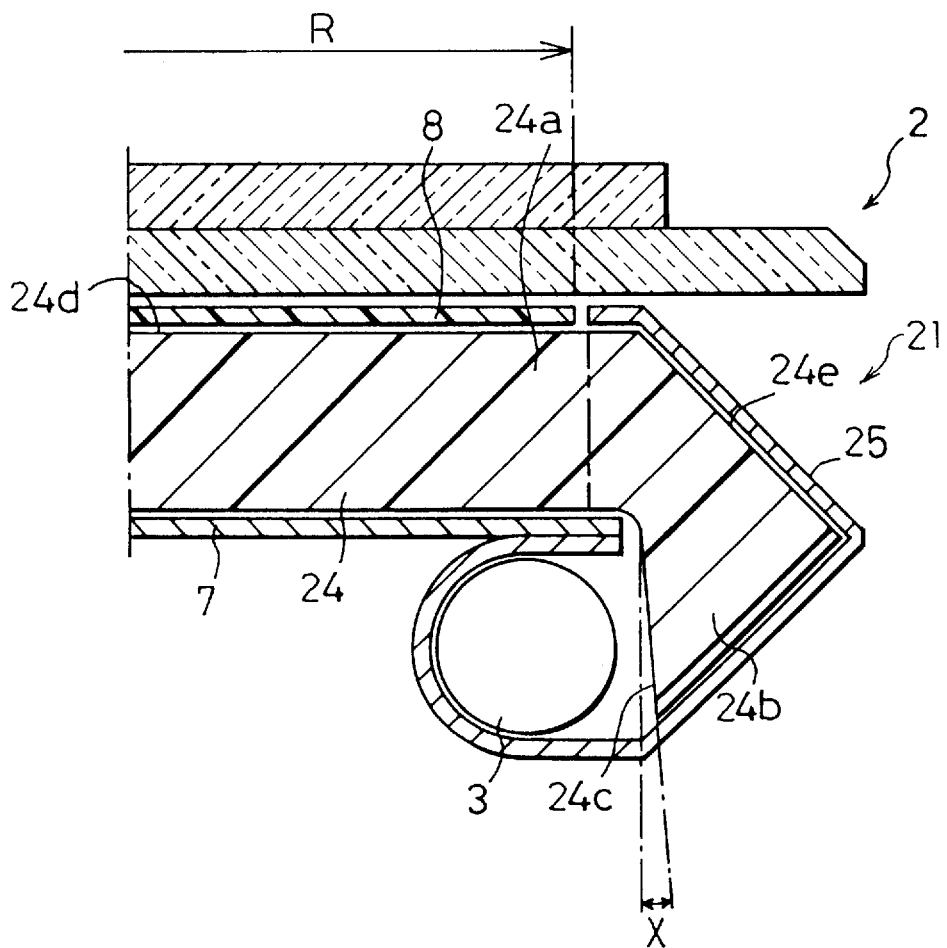
FIG. 11 is a schematic cross section of a liquid crystal display device incorporating a lighting apparatus according to still another embodiment of the present invention.

A plane light source device 21 as a lighting apparatus of this embodiment is used in a liquid crystal display device. Namely, as illustrated in FIG. 11, the plane light source device 21 is disposed behind the back surface of the flat liquid crystal panel 2 to irradiate the liquid crystal panel 2 from the back.

Figure 12:
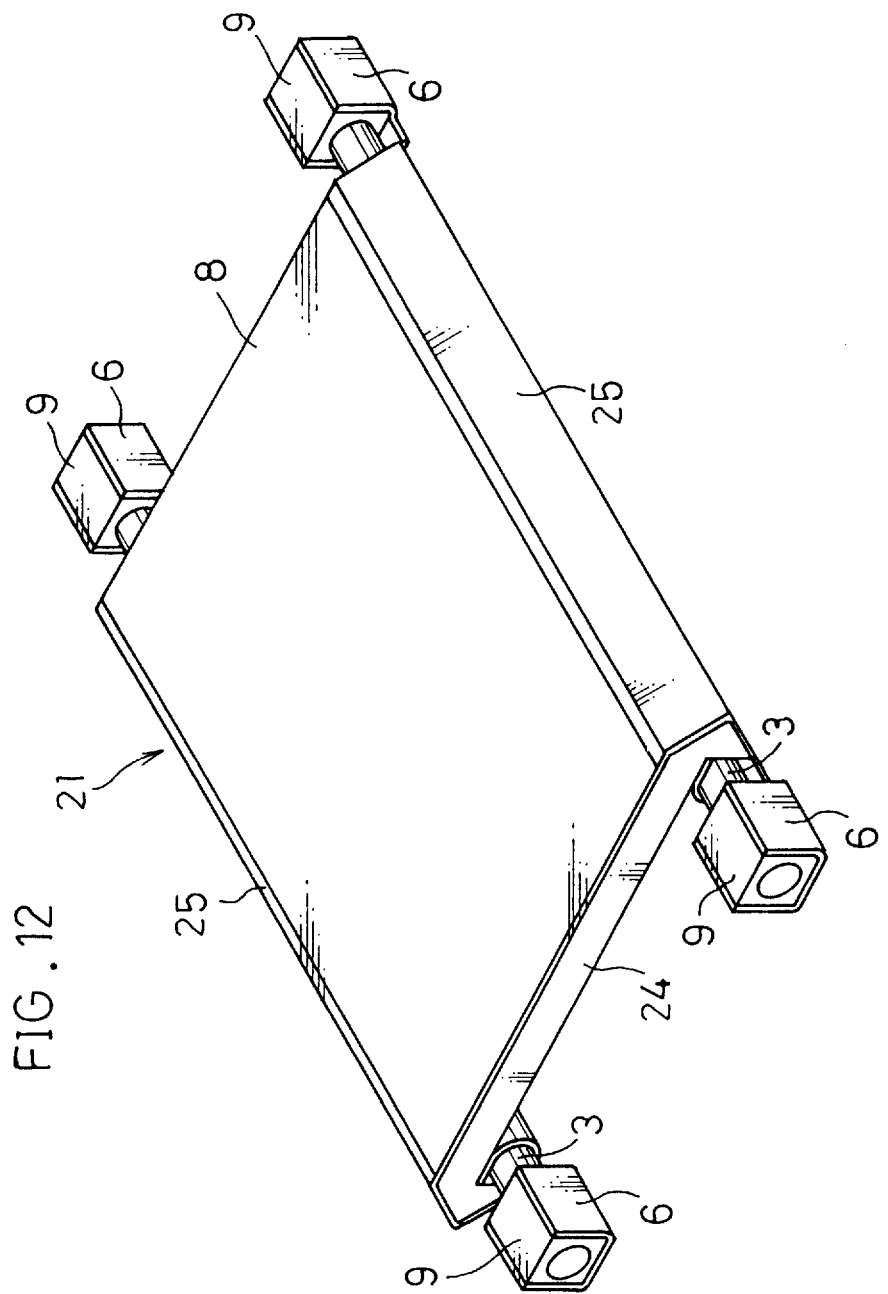
FIG. 12 is a perspective view showing the outer appearance of the lighting apparatus of FIG. 11.

The plane light source device 21 has an outer appearance shown in the perspective view of FIG. 12, and mainly includes two light sources 3, a light guiding plate 24 for guiding light from the light sources 3, and two reflectors 25. Each reflector 25 reflects the light from each light sources 3 so that the light efficiently falls on the light guiding plate 24.

The light source 3 is a linear light source, for example, a fluorescent tube, which is used in a conventional edge-light type lighting apparatus for a liquid crystal display device.

The light guiding plate 24 is formed into the shape of a substantially flat plate by a material having high transmissivity with respect to every range of wavelength, for example, a transparent acrylic resin. As illustrated in FIGS. 11 and 12, each of the end portions of the light guiding plate 24 near the light sources 3 is bent downward so as to have a substantially triangular profile. The position at which the end portion is bent is located outside the data display space R of the light crystal display panel 2 above the light guiding plate 24. In the light guiding plate 24, the center portion, i.e., flat plate portion, that corresponds to the data display space R is a data display space corresponding section (hereinafter just referred to as the corresponding section) 24a. Similarly, the end portion, i.e., bent portion, of the light guiding plate 24 is a non-data-display space corresponding section (hereinafter referred to as the non-corresponding section) 24b.

Light falls on the light guiding plate 24 through the light-incidence end surface 24c of the bent portion of the non-corresponding section 24b. The light source 3 is disposed behind the back surface of the light guiding plate 24 to face the light-incidence end surface 24c.

In this embodiment, the light-incidence end surface 24c is not perpendicular to the flat-panel-like corresponding section 24a, i.e., the liquid crystal display panel 2 arranged parallel to the corresponding section 24a. Namely, the light-incidence end surface 24c tilts at an angle of X. The reason for this will be discussed later.

Moreover, in this embodiment, the bent portion of the non-corresponding section 24b has a substantially triangular profile with a vertical angle of about 90 degrees.

The reflector 25 is formed by a metal, or film or plastic on which a metal is deposited. The reflector 25 extends to a position just before the data display space R of the liquid crystal display panel 2, and is fixed to the light guiding plate 24 so as to cover the periphery of each light source 3 except a portion facing the light-incidence end surface 24c of the light guiding plate 24, and the whole non-corresponding section 24b of the light guiding plate 24.

As illustrated in FIG. 12, electrode holding members 6 are integrally formed at both ends of each reflector 25 in its longitudinal direction. The light source 3 is fixed to the electrode holding members 6 by the silicon holders 9 which are fitted into the electrode sections on both ends of the light source 3.

The back reflector 7 is disposed on the back surface of the light guiding plate 24 as shown in FIG. 11 so as to reflect leakage light from the back surface of the light guiding plate 24 back into the light guiding plate 24. Moreover, the diffusing sheet 8 is placed over a light emitting surface 24d of the light guiding plate 24 so as to diffuse the light emitted from the light emitting surface 24d.

The following description will discuss the movement of the light in the light guiding plate 24 according to the structure of the plane light source device 21.

The light emitted by the light source 3 goes through the light-incidence end surface 24c of the light guiding plate 24, enters into the bent portion of the non-corresponding section 24b, and reaches the inside surface of the outer end surface 24e of the bent portion. At this time, light which has fallen on the inside surface of the outer end surface 24e at an incident angle not smaller than the critical angle (42.1 degrees in this embodiment) goes through the non-corresponding section 24b while being totally reflected repeatedly and moves toward the corresponding section 24a of the light guiding plate 24. On the other hand, light which has fallen on the inside surface of the outer end surface 24e at an incident angle smaller than the critical angle is separated into light to be reflected and light to be once emitted from the light guiding plate 24. The light emitted from the light guiding plate 24 is reflected by the reflector 25 arranged along the outer end surface 24e, moved back into the light guiding plate 24, and advances toward the corresponding section 24a of the light guiding plate 24 in the manner mentioned above.

Thus, the light which has reached the corresponding section 24a is emitted from the light emitting surface 24d of the corresponding section 24a by total reflection in the light guiding plate 24 or by reflection on the back reflector 7 disposed on the back surface of the light guiding plate 24. The light emitted from the light emitting surface 24d is diffused by the diffusing sheet 8 and uniformly irradiates the liquid crystal display panel 2.

Figure 13:
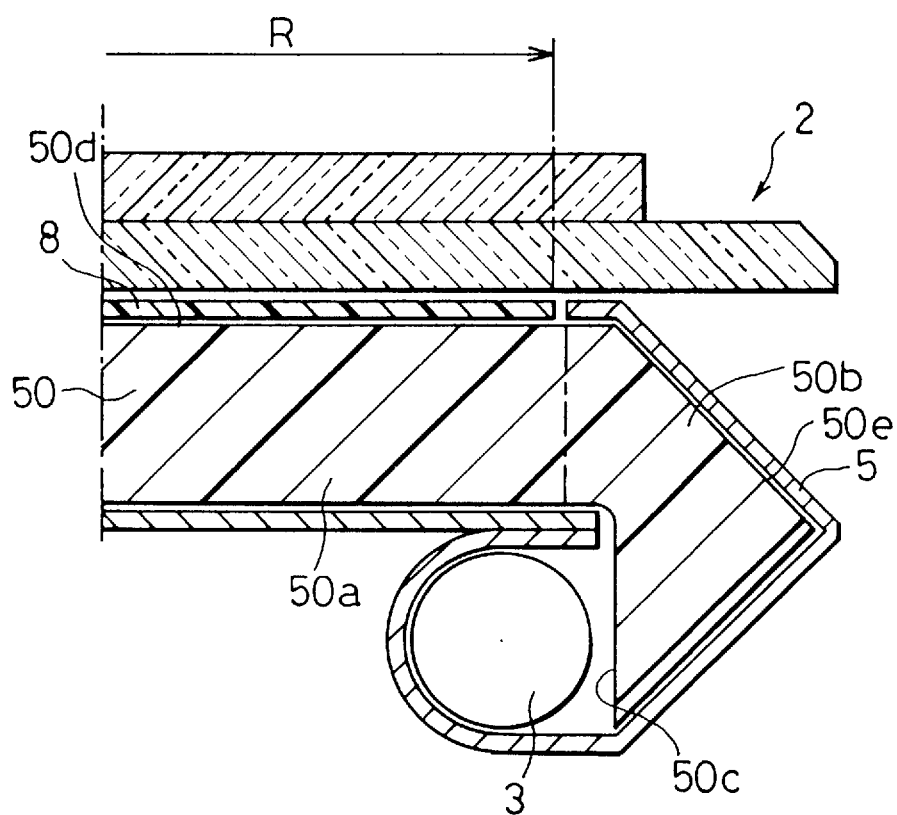
FIG. 13 is a schematic cross section of a lighting apparatus as a comparable example of the present invention.
Figure 14:
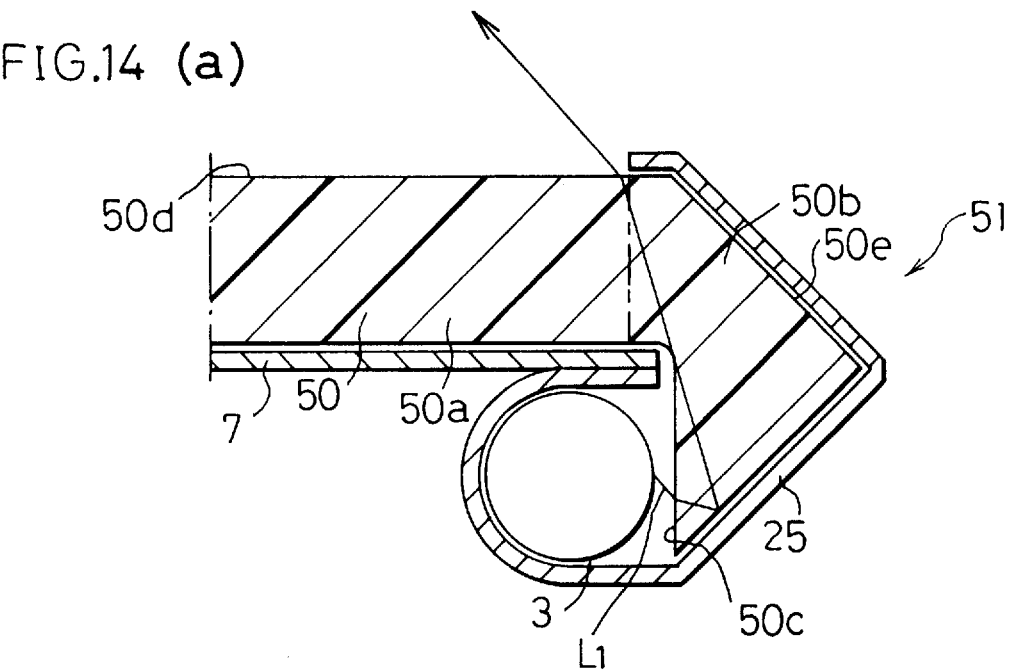
FIG. 14($a$) shows the movement of light in the comparable lighting apparatus of FIG. 13, and FIG. 14($b$) shows the movement of light in the lighting apparatus of FIG. 11.
Figure 14:
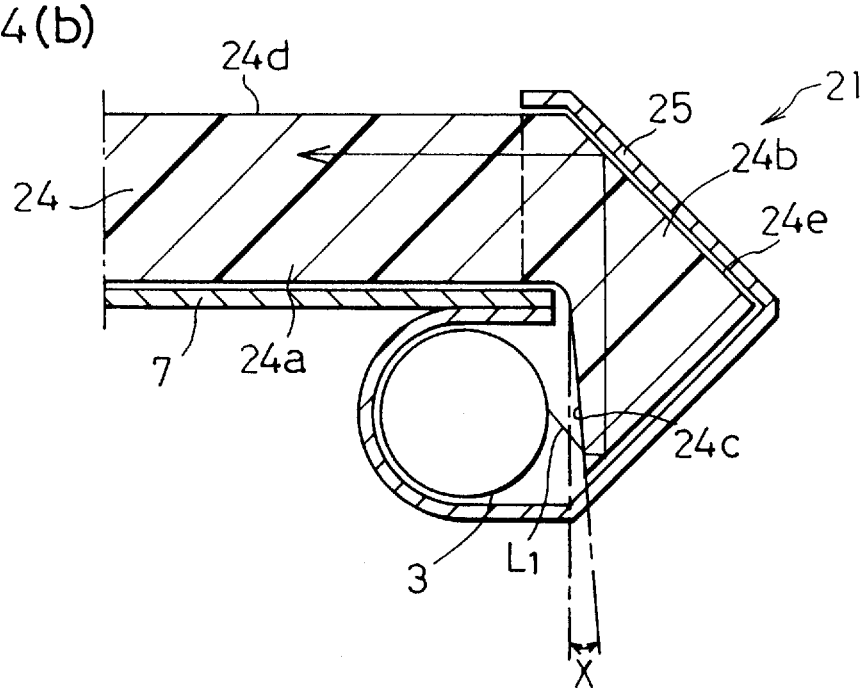

For instance, as a structure in which a light incident end portion where a light source of the light guiding plate is positioned is simply bent, as illustrated in FIG. 13, a plane light source device 51 may be constructed by arranging a light-incidence end surface 50c of the bent portion of a guiding plate 50 to be perpendicular to a corresponding section 50a in the shape of a flat plate.

However, in this plane light source device 51, a large amount of the light incident from an edge part of the light-incidence end surface 50c of the bent portion falls at an incident angle smaller than the critical angle on a light emitting surface 50d in the vicinity of the boundary section between a corresponding section 50a and a non-corresponding section 50b of the light guiding plate 50 when being guided from the non-corresponding section 50b to the corresponding section 50a like light $L_1$ shown in FIG. 14(a), for example. This causes such a phenomenon that an end portion of the corresponding section 50a near the light source 3 becomes brighter than other portions, i.e., bright lines appear.

On the other hand, in the above-mentioned plane light source device 21 of this embodiment, as described above, the light-incidence end surface 24c formed at the bent portion of the light guiding plate 24 tilts at an angle of X with respect to the corresponding section 24a in the shape of a flat plate, i.e., the liquid crystal display panel 2 which is parallel to the corresponding section 24a. As a result, the course of light like the light $L_1$ is changed as shown in FIG. 14(b), and the light moves toward the corresponding section 24a. It is therefore possible to reduce the light from falling on the light emitting surface 24d at the boundary section between the corresponding section 24a and the non-corresponding section 24b of the light guiding plate 24 at an angle smaller than the critical angle. Namely, it is possible to reduce the bright lines from appearing at an end portion of the corresponding section 24a near the light source 3. With respect to the range of angle X, if the tilt angle is too small, effects cannot be obtained. Whereas if the tilt angle is too large, the efficiency of incidence deteriorates. Thus, a preferable range of angle X is between 2 to 10 degrees.

As described above, in the plane light source device 21 of this embodiment, an end portion of the light guiding plate 24 near the light source 3 is bent in a direction opposite to the light emitting surface 24d. Moreover, the light source 3 is disposed along an inner end surface of the bent portion of the light guiding plate 24 (light-incidence end surface 24c). Namely, the light source 3, which causes an increase in the area of portions other than the corresponding section in a conventional lighting apparatus, is disposed on the back surface of the light guiding plate 24. It is thus possible to provide a lighting apparatus in which the ratio of the area occupied by the corresponding section 24a to the total area is high.

Consequently, by incorporating such a plane light source device as a lighting apparatus into a liquid crystal display device, the outside dimensions of the display device with respect to the area of the data display space R can be decreased. Namely, the display device can have smaller outside dimensions compared to a conventional display device having the data display space R of the same area.

Moreover, the light-incidence end surface 24c formed at the non-corresponding section 24b of the light guiding plate 24 is not perpendicular to the flat plate portion, i.e., the corresponding section 24a, and tilts. It is therefore possible to reduce light from being emitted from the boundary section between the corresponding section 24a and the non-corresponding section 24b of the light guiding plate 24, thereby decreasing the appearance of bright lines in the corresponding section 24a in the vicinity of the boundary section.

By decreasing the bright lines as mentioned above, it is possible to unify the in-plane brightness of the plane light source device. Therefore, if such a plane light source device is incorporated into a liquid crystal display device, the display quality of the liquid crystal display device is improved. In addition, if the allowable level of the bright lines is arranged to be similar to that in a prior art, since a portion which requires blocking of light in the prior art is usable as the corresponding section, the range of the corresponding section 24a shown in FIG. 11 can further be increased. It is thus possible to further reduce the outside dimensions of the liquid crystal display device with respect to the area of the data display space R.

Furthermore, since the light-incidence end surface 24c is arranged to tilt at a predetermined angle X from a direction perpendicular to the corresponding section 24a, the emission of light from the light emitting surface 24d at the boundary section between the corresponding section 24a and the non-corresponding section 24b of the light guiding plate 24 is prevented. Namely, since the light is guided to the corresponding section 24a in the light guiding plate 24 and emitted, the brightness at the corresponding section 24a can be improved.

Additionally, in the plane light source device 21, the reflector 25 is formed so as to cover the periphery of the light source 3 except a portion facing the light-incidence end surface 24c, and the non-corresponding section 24b of the light guiding plate 24. Since the upper part of the light source 3 is covered with the reflector 25, it is possible to prevent the light emitted from the upper part of the light source 3 from directly falling on the corresponding section 24a of the light guiding plate 24. It is therefore possible to prevent the appearance of luminance spots which are caused by the direct incidence of light on the corresponding section 24a of the light guiding plate 24 without newly providing, for example, a light blocking film on the upper part of the light source 3.

Moreover, since the outer end surface 24e of the bent portion of the light guiding plate 24 is covered with the reflector 25, among the light which has fallen on the light-incidence end surface 24c of the light guiding plate 24, light which has fallen on the inside surface of the outer end surface 24e at an incident angle smaller than the critical angle and been once emitted from the outer end surface 24e is brought back into the light guiding plate 24 by the reflector 25. Consequently, there is no need to newly provide, for example, a reflecting film on the outer end surface 24c of the bent portion, thereby preventing an increase in the number of members. It is thus possible to reduce the cost.

In order to reduce the thickness of the apparatus and effectively use the light of the light source 3, it is desirable that the thickness of a portion of the non-corresponding section 24b where the light-incidence end surface 24c is formed, i.e., the thickness of a portion protruding downward from the lower surface of the corresponding section 24a is thicker than that of the flat plate portion as the corresponding section 24a. In order to more effectively use the light of the light source 3, it is desirable that the thickness of the portion where the light-incidence end surface 24c is formed is substantially equal to the tube diameter of the light source 3.

In this embodiment, the bent portion of the non-corresponding section 24b of the light guiding plate 24 has a triangular profile. However, it is also possible to arrange the bent portion to have a substantially trapezoid profile or a semi-circular profile.

In the light guiding plate 24, the light-incidence end surface 24c of the non-corresponding section 24b is formed by a single plane which tilts at the predetermined angle X in a direction opposite to the light source 3 with respect to a plane perpendicular to the corresponding section 24a. Alternatively, the light guiding plate 24 may be constructed to have the structures of light guiding plates 30 and 31 shown in FIGS. 15 and 17, respectively.

Figure 15:
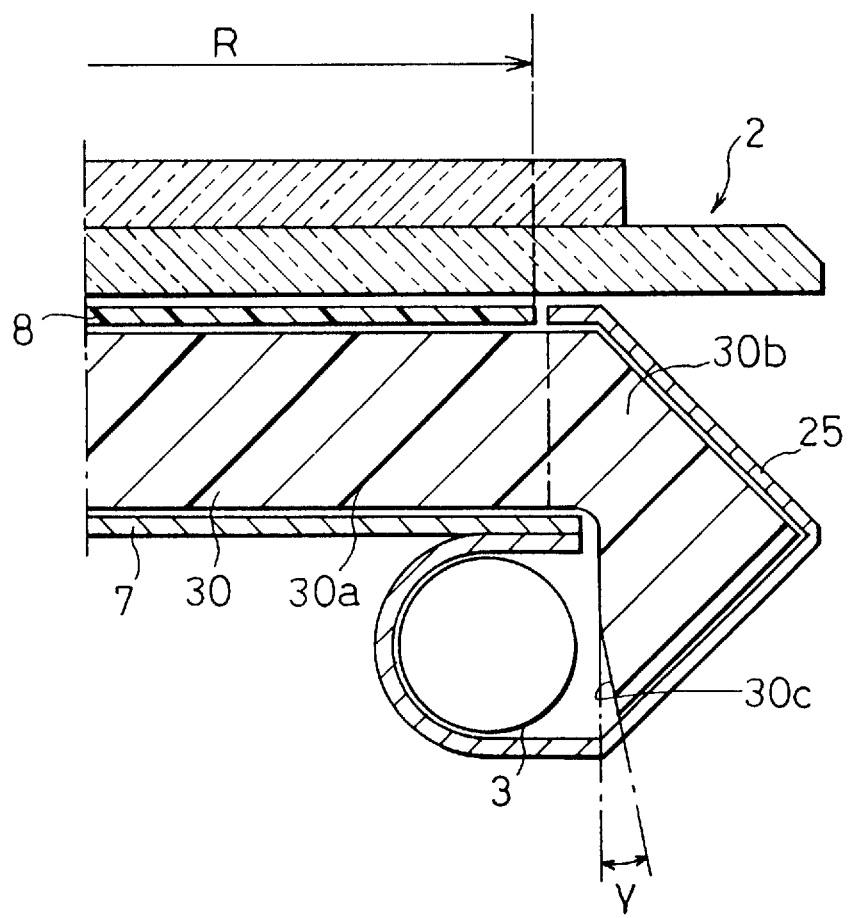
FIG. 15 is a schematic cross section of a liquid crystal display device incorporating a lighting apparatus as a modified example of the liquid crystal display device of FIG. 11.

In the plane light source device of FIG. 15, light-incidence end surface 30c of a non-corresponding section 30b of the light guiding plate 30 is formed by a plurality of planes. More specifically, as illustrated in FIG. 15, a predetermined portion of the light-incidence end surface 30c, which extends downward from the bent position of a lower surface of the light guiding plate 30 is perpendicular to a corresponding section 30a. A portion of the light-incidence end surface 30c which is located lower than the predetermined portion tilts at an angle of Y in a direction opposite to the light source 3 with respect a plane perpendicular to the corresponding section 30a. The tilt angle Y is preferably within the range of from 2 to 10 degrees for the same reason as mentioned above in explaining the structure of the light guiding plate 24.

Figure 16A:
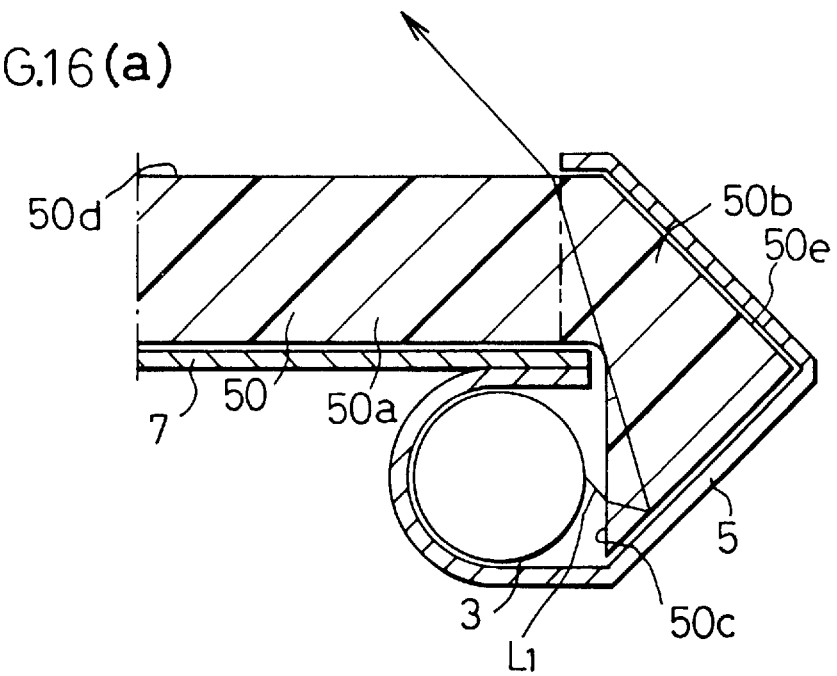
FIG. 16($a$) shows the movement of light in the comparable lighting apparatus of FIG. 13, and FIG. 16($b$) shows the movement of light in the lighting apparatus of FIG. 15.
Figure 16B:
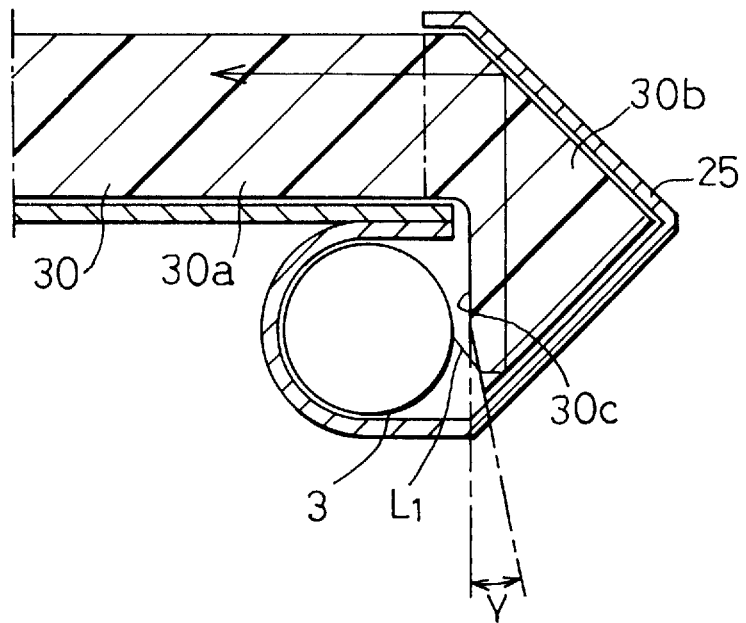

The portion perpendicular to the corresponding section 30a is not involved in the generation of bright lines, while the portion tilting at an angle of Y generates bright lines if it is a plane perpendicular to the corresponding section 30a. Specifically, as illustrated in FIG. 16(a), when a light-incidence end surface 50c is formed by a single plane perpendicular to a corresponding section 50a, light $L_1$ which is incident at an incident angle smaller than the critical angle on a light emitting surface 50d at the boundary section between the corresponding section 50a and the non-corresponding section 50b of the light guiding plate 50 changes its course and moves toward the corresponding section 30a as shown in FIG. 16(b), thereby reducing the appearance of bright lines. Moreover, since the portion which is not involved in the generation of bright lines can effectively use the light from the light source, it is possible to reduce the generation of bright lines by more effectively using the light from the light source compared to the structure shown in FIG. 11. An advantage of the light guiding plate 24 having the structure of FIG. 11 is that it is more easily fabricated than the light guiding plate 30.

Figure 17:
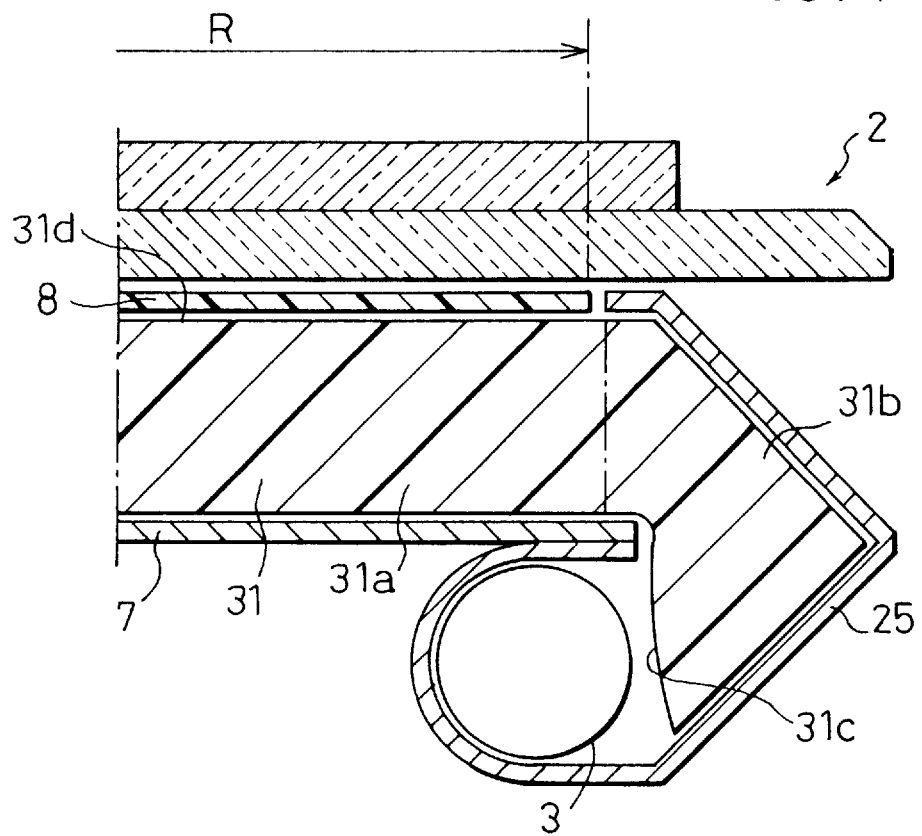
FIG. 17 is a schematic cross section of a liquid crystal display device incorporating a lighting apparatus as another modified example of the liquid crystal display device of FIG. 11.
Figure 18A:
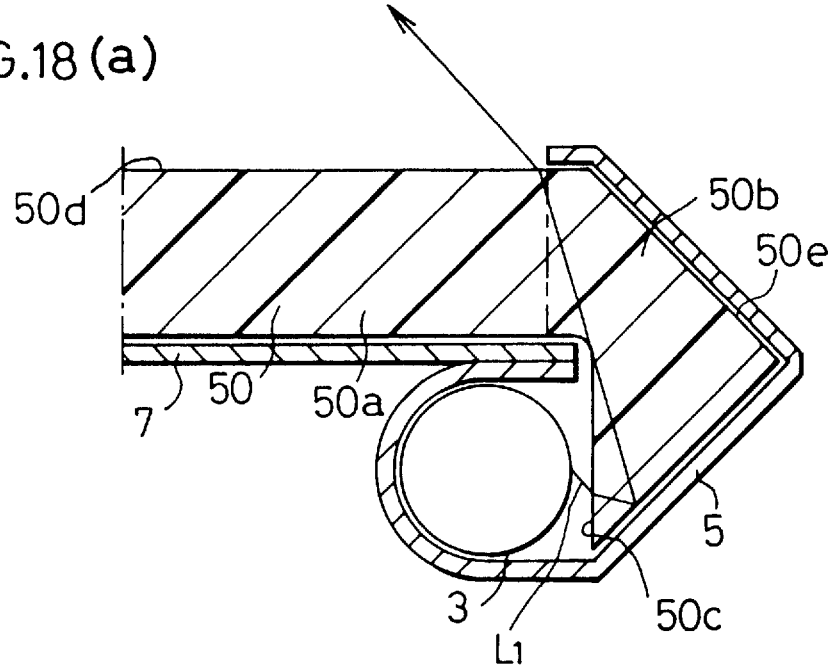
FIG. 18($a$) shows the movement of light in the comparable lighting apparatus of FIG. 13, and FIG. 18($b$) shows the movement of light in the lighting apparatus of FIG. 17.
Figure 18B:
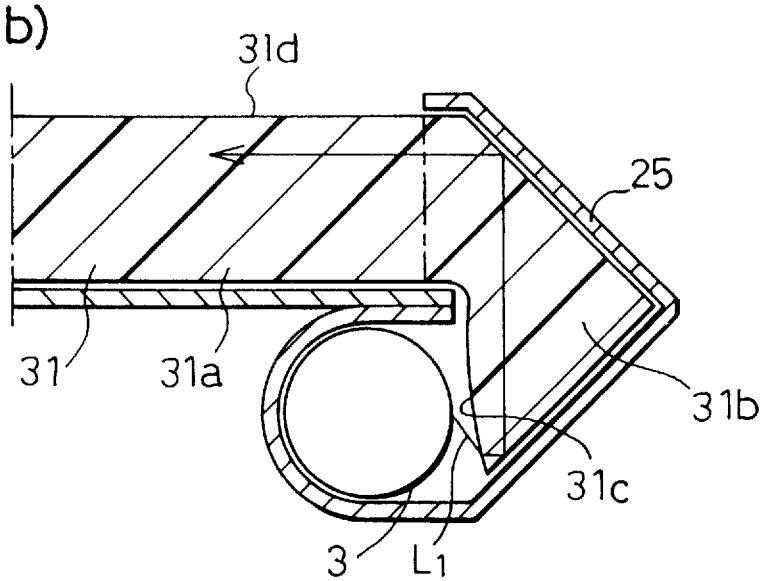

In the structure of a light guiding plate 31 in a plane light source device shown in FIG. 17, a light-incidence end surface 31c is curved so that it is separated from the normal line of a light emitting surface 31 by a greater distance at a more distant point in a downward direction from the bent position of a lower surface of a corresponding section 31a. With respect to the shape of the surface of the light-incidence end surface 31c, it is desirable to have the shape of an arc of circle or a multidimensional curve in profile. However, in such a structure, as illustrated in FIG. 18(a), if the light-incidence end surface 50c is formed by a single plane perpendicular to the corresponding section 50a, the light $L_1$, which has fallen on a light emitting surface 50d at the boundary section between the corresponding section 50a and the non-corresponding section 50b of the light guiding plate 50 at an angle smaller than the critical angle, changes its course and moves toward the corresponding section 50a as shown in FIG. 18(b), thereby reducing the generation of bright lines. Furthermore, since the light incident section is designed to have the most efficient structure for the incidence of light while reducing the generation of bright lines, it is possible to reduce the generation of bright lines by using the light from the light source more effectively than in the structure shown in FIG. 11.

[Embodiment 4]

The following description will discuss another embodiment of the present invention with reference to FIGS. 19 to 26. The members having the same function as in the above-mentioned embodiment will be designated by the same code and their description will be omitted.

Figure 20:
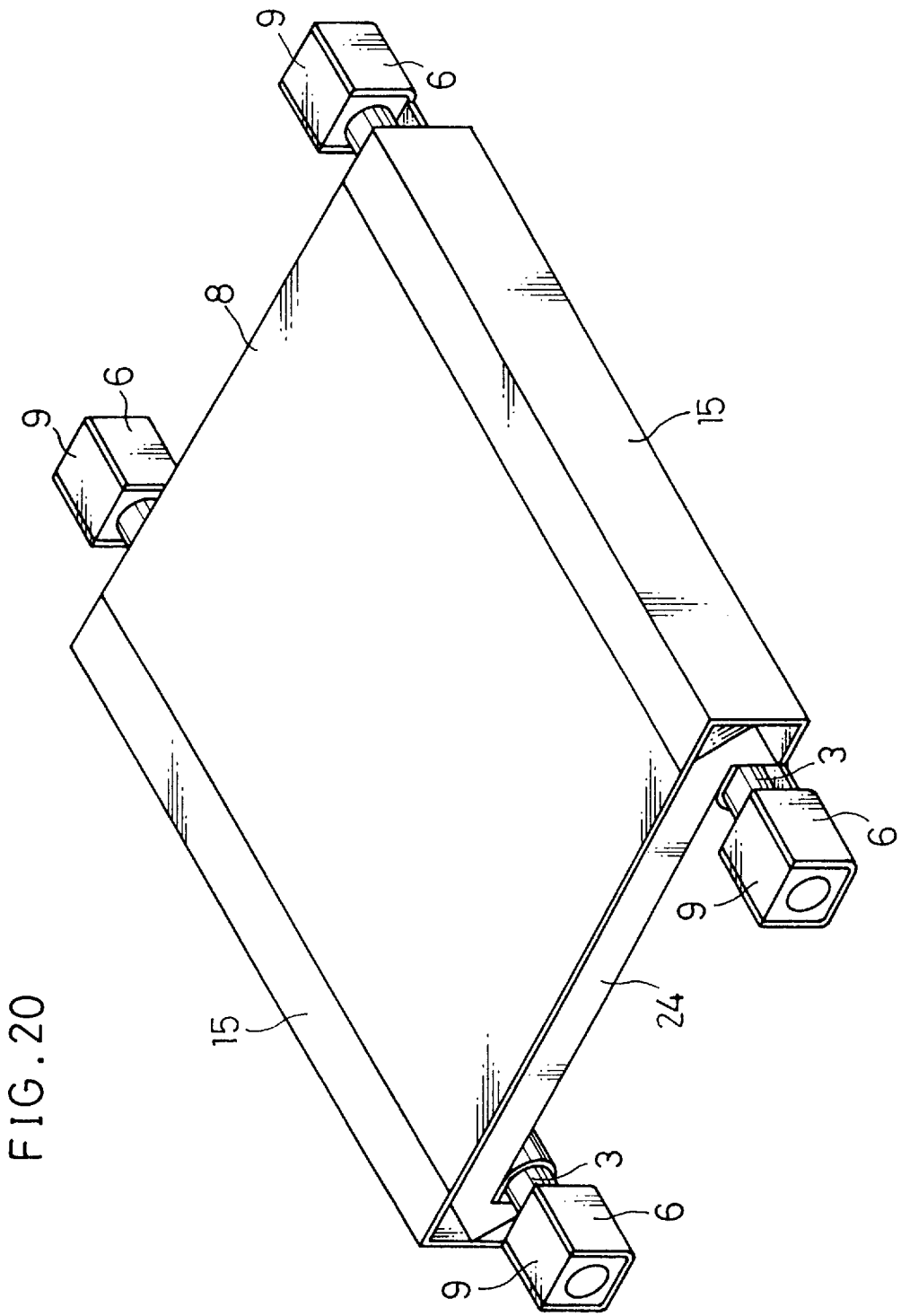
FIG. 20 is a perspective view showing the outer appearance of the lighting apparatus of FIG. 19.

A plane light source device of this embodiment has a combined structure of the light guiding plate 24, 30 or 31 in the plane light source device of Embodiment 3 and the reflector 15 in the plane light source device 11 of Embodiment 2. FIG. 20 is a perspective view showing the outer appearance of the plane light source device formed by a combination of the light guiding plate 24 and the reflector 15. In this plane light source device, spatial sections 10 are formed by a layer of air between the non-corresponding section 24b of the light guiding plate 24 and the reflector 15.

For example, in the plane light source device shown in FIG. 13 which is described as a comparable example in Embodiment 3, the light which has fallen on the outer end surface 50e of the non-corresponding section 50b of the light guiding plate 50 at an angle smaller than the critical angle and been once emitted from the light guiding plate 50 is reflected by the reflector 5 disposed along the outer end surface 50e at an angle which is substantially equal to an angle at which the light is reflected by the outer end surface 50e.

On the other hand, in the plane light source device shown in FIG. 6 in Embodiment 2, the light which has fallen on the outer end surface 14e of the non-corresponding section 14b of the light guiding plate 14 at an angle smaller than the critical angle and been once emitted from the light guiding plate 14 is reflected by the reflector 15 through the spatial sections 10. Namely, as shown in FIGS. 9(a) and 9(b), the light which has been emitted from the light guiding plate 14, gone through the spatial section 10 and been reflected by the reflector 15, falls on the corresponding section 14a through a light path which is different from a light path along which the light reflected by the outer end surface 14e moves.

In this structure, even when the light reflected by the outer end surface 14e falls on the light emitting surface 14d at the boundary section between the corresponding section 14a and the non-corresponding section 14b at an angle smaller than the critical angle and is emitted from the light emitting surface 14d, the light which has gone through the light guiding plate 14 from the outer end surface 14e can never be emitted from the light emitting surface 14d along the substantially same light path, thereby reducing the bright lines in the boundary section.

Figure 21A:
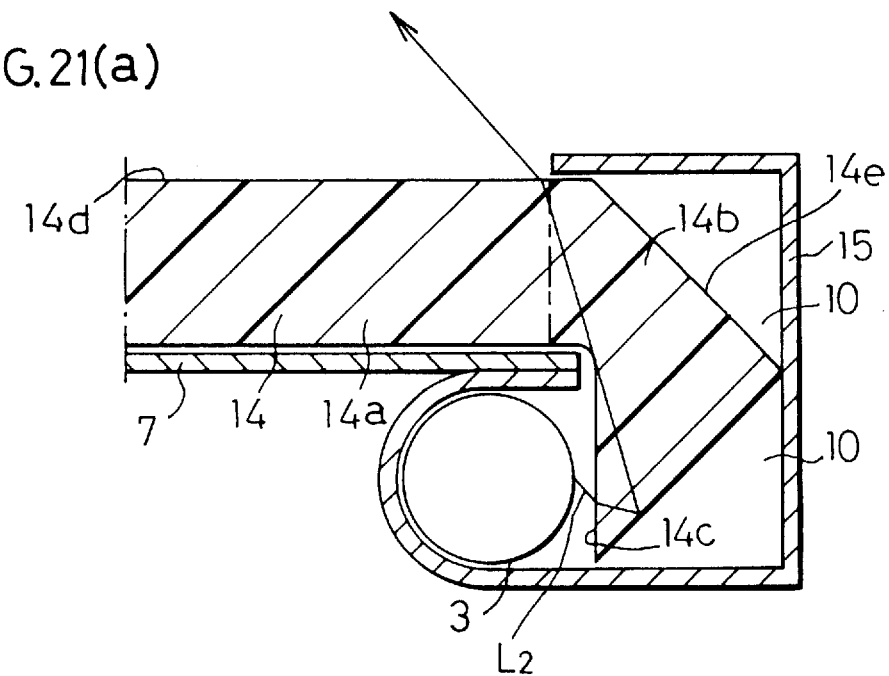
FIG. 21(a) shows the movement of light in a lighting apparatus as a comparable example of the present invention.
Figure 23A:
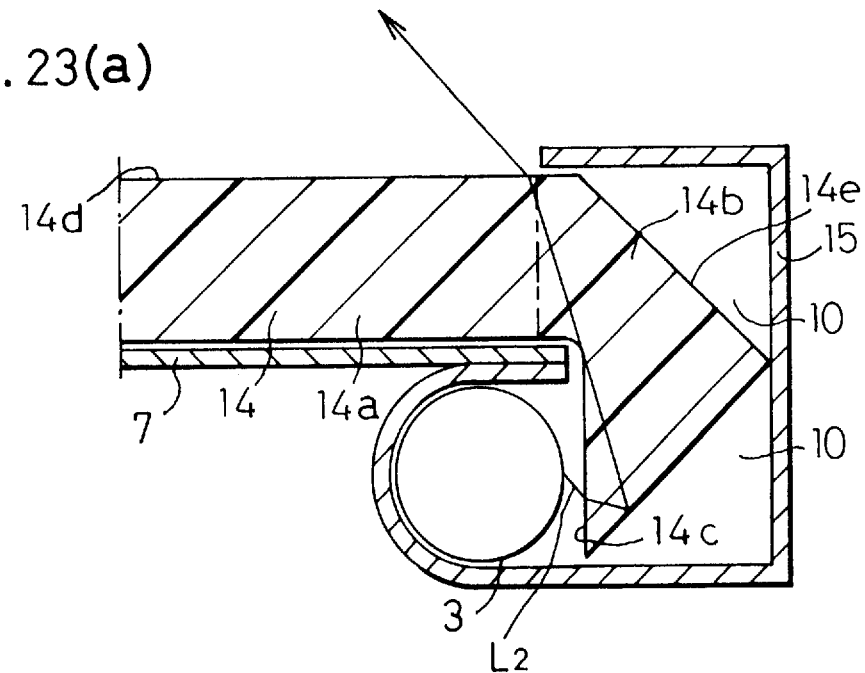
FIG. 23(a) shows the movement of light in the lighting apparatus as the comparable example of the present invention.

However, even in such a structure, as illustrated in FIG. 21(a) (FIG. 23(a), FIG. 25(a)), it is impossible to change the light path of the light $L_2$ which has been reflected by the outer end surface 14e, fallen on the light emitting surface 14d at the boundary section between the corresponding section 14a and the non-corresponding section 14b of the light guiding plate 14 at an incident angle not greater than the critical angle and been emitted from the light emitting surface 14d.

Figure 19:
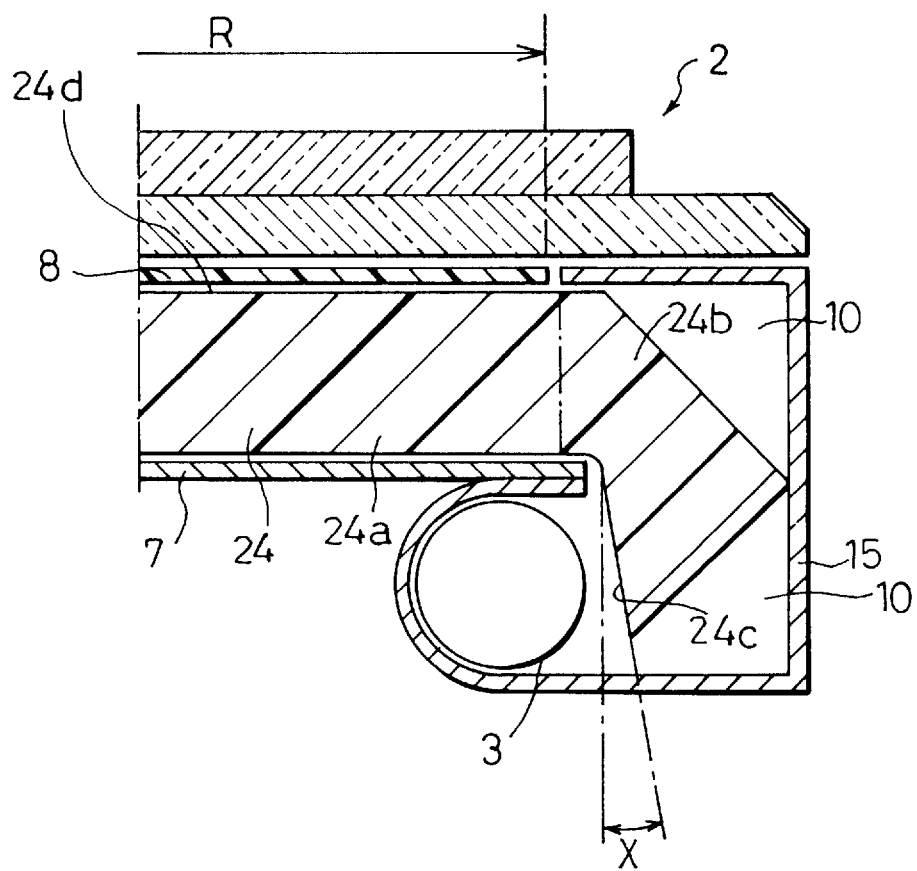
FIG. 19 is a schematic cross section of a liquid crystal display device incorporating a lighting apparatus according to yet another embodiment of the present invention.
Figure 21B:
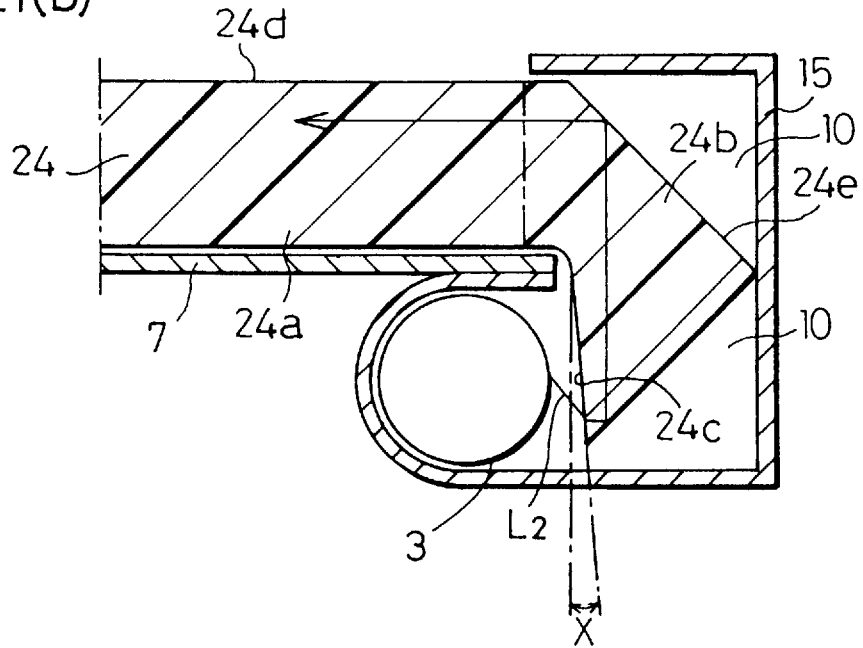
FIG. 21(b) shows the movement of light in the lighting apparatus of FIG. 19.
Figure 22:
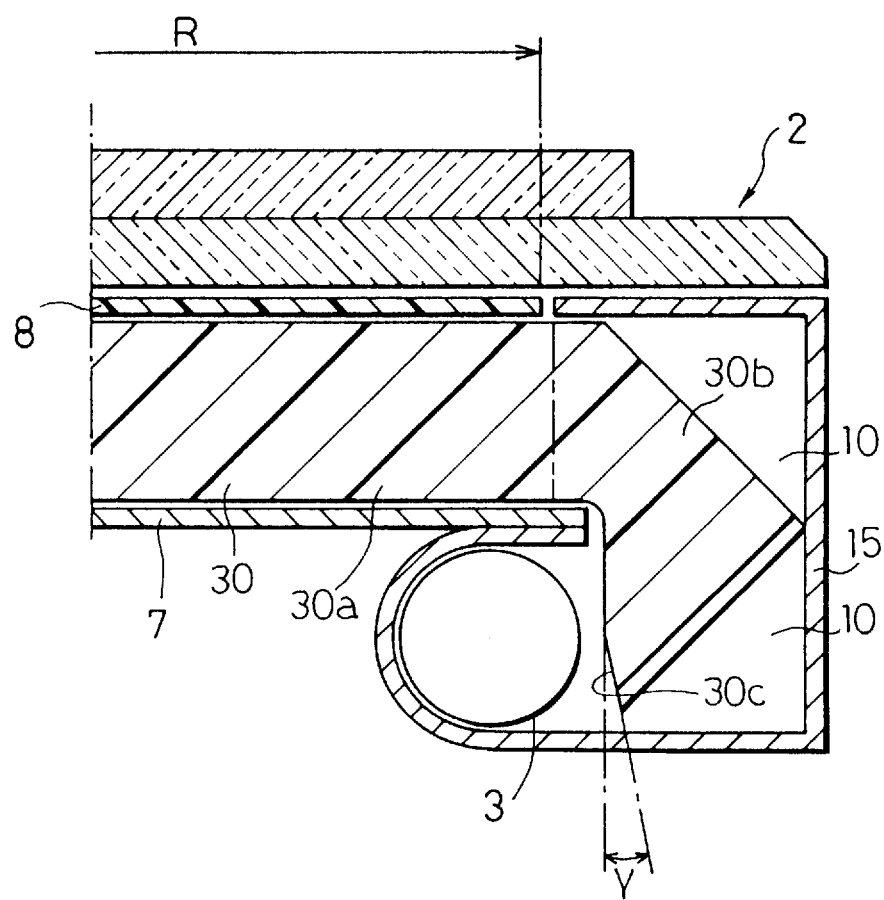
FIG. 22 is a schematic cross section of a liquid crystal display device incorporating a lighting apparatus as a modified example of the lighting apparatus of FIG. 19.
Figure 23B:
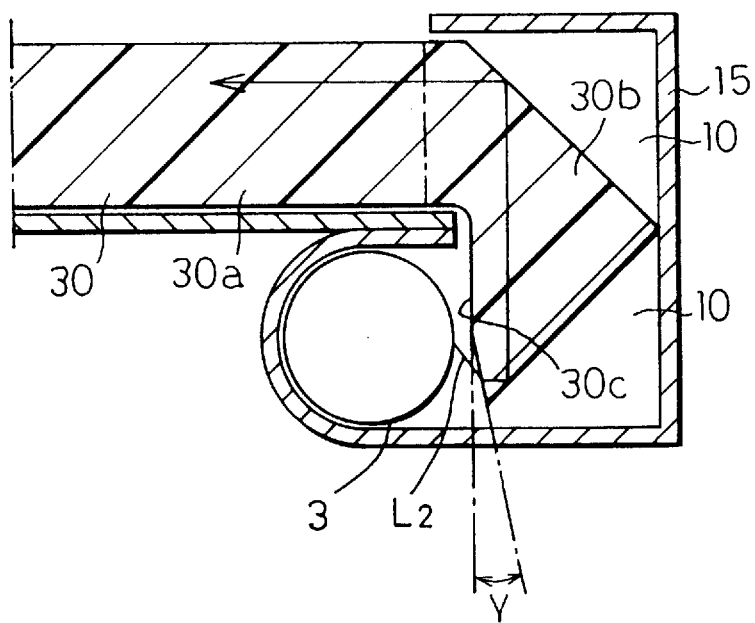
FIG. 23(b) shows the movement of light in the lighting apparatus of FIG. 22.
Figure 24:
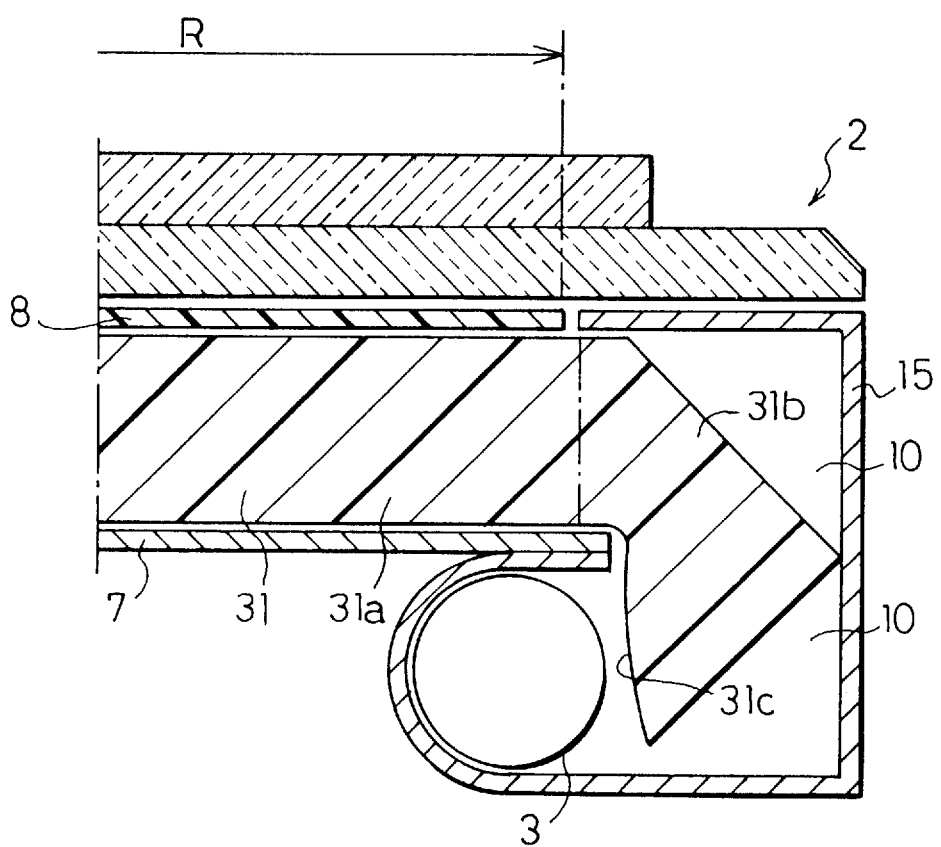
FIG. 24 is a schematic cross section of a liquid crystal display device incorporating a lighting apparatus as another modified example of the liquid crystal display device of FIG. 19.
Figure 25:
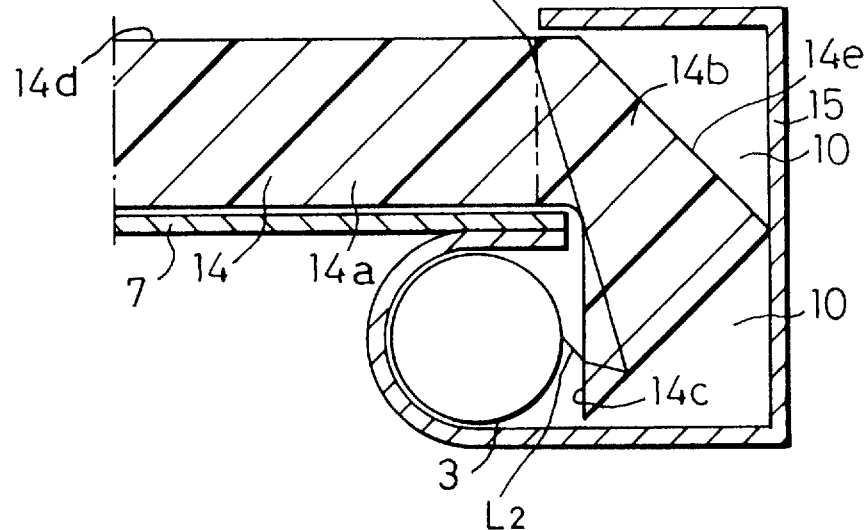
FIG. 25(a) shows the movement of light in a lighting apparatus as the comparable example of the present invention.
FIG. 25(b) shows the movement of light in the lighting apparatus of FIG. 24.
Figure 25:
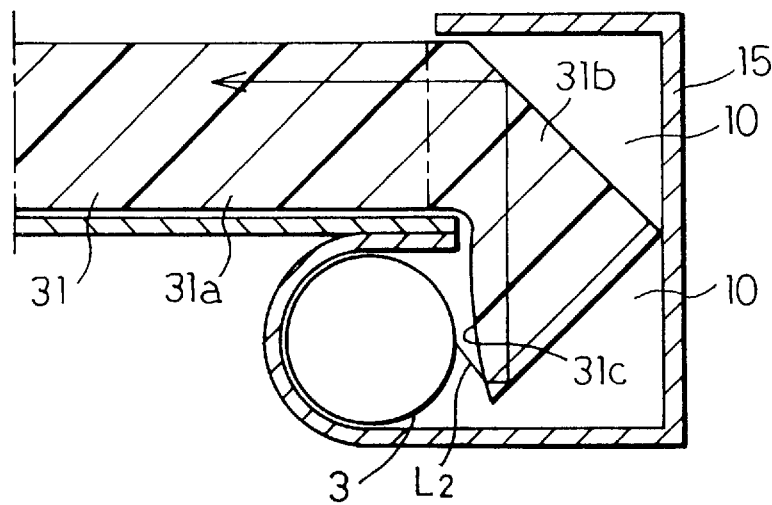
Figure 26:
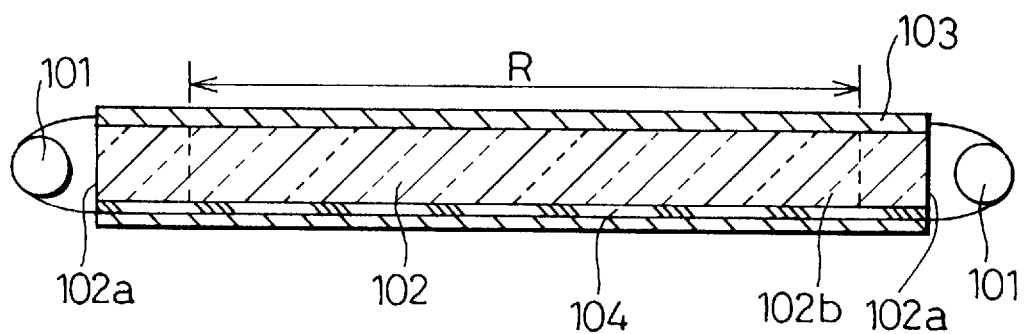
FIG. 26 is a view schematically showing the structure of a conventional edge-light type lighting apparatus.
Figure 27:
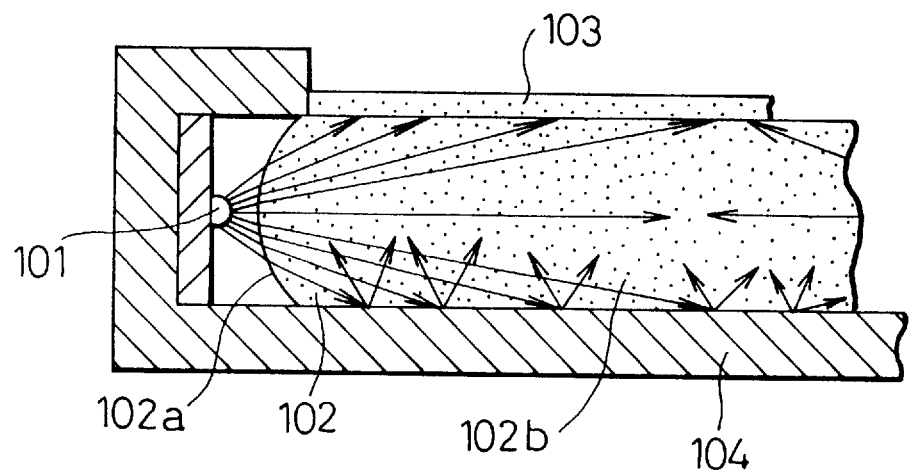
FIG. 27 is a view schematically showing the structure of a conventional edge-light type lighting apparatus.
Figure 28:
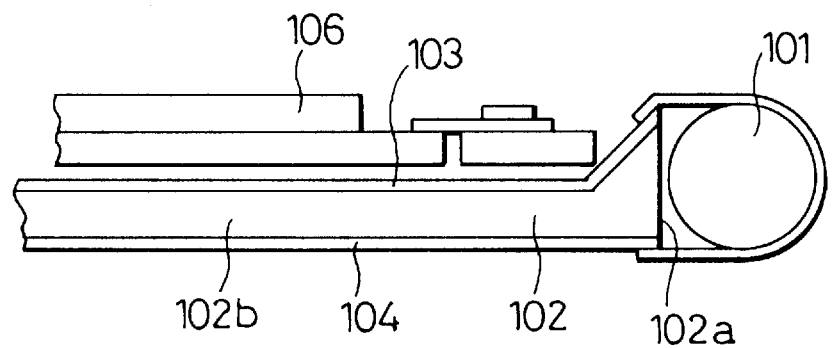
FIG. 28 is a view schematically showing the structure of a conventional edge-light type lighting apparatus.
Figure 29:
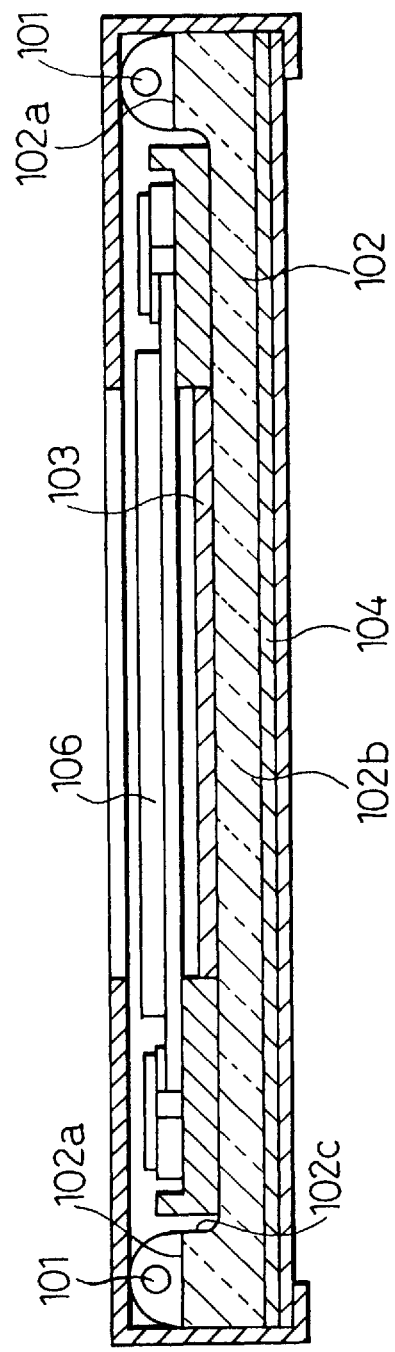
FIG. 29 is a view schematically showing the structure of a conventional edge-light type lighting apparatus.

Whereas in the structures where the light guiding plates 24, 30 and 31 of the above-mentioned embodiments are used as shown in FIGS. 19, 22 and 24, the light $L_2$ changes its course and moves toward the corresponding section 24a, 30a and 31a as shown in FIGS. 21(b), 23(b) and 25(b), respectively.

It is therefore possible to reduce light from falling on the light-incidence end surface 24d at the boundary section between the corresponding section 24a and the non-corresponding section 24b of the light guiding plate 24 at an angle smaller than the critical angle, and reduce the generation of bright lines in the vicinity of the boundary section. Similar effects can be obtained by the light guiding plates 30 and 31.

In short, by combining the structure of the light guiding plate 24, 30 or 31 and the reflector 15, the bright lines can be reduced more effectively than in the structures of Embodiments 2 and 3. Finally, the explanation of the effect produced by reducing the bright lines is omitted here because it is described in Embodiment 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting apparatus comprising:
   a light emitting section in the shape of a flat plate having a light emitting surface on one side, said light emitting section being made from a light transmitting material;
   a light source disposed on an opposite side of said light emitting section with respect to said light emitting surface; and
   a light guiding section for guiding light from said light source into said light emitting section through a side surface of said light emitting surface, said light guiding section including a light transmitting section lying in a bent shape from the side surface of said light emitting section, to a position facing said light source, said light transmitting section and said light emitting section being integrally formed from a single piece of said light transmitting material.

2. The lighting apparatus as set forth in claim 1,
   wherein said light source is disposed so that at least a part of said light source is positioned on an inside position of the side edge section of said light emitting surface.

3. The lighting apparatus as set forth in claim 1,
   wherein said light guiding section further includes a light reflecting section for covering an outside surface of said light transmitting section except at least a portion facing said light source.

4. The lighting apparatus as set forth in claim 3,
   wherein said light source is a tube-like light source which is disposed so that an axis of said light source is parallel to a longitudinal direction of the side surface of said light emitting section,
   said light transmitting section includes at the position facing said light source a light incident surface on which light from said light source is incident,
   a width of said light incident surface in a direction orthogonal to a direction of the axis of said light source is substantially equal to a tube diameter of said light source, and
   a thickness of said light emitting section is smaller than the width of said light incident surface.

5. The lighting apparatus as set forth in claim 3,
   wherein a surface of said light reflecting section facing said light transmitting section is formed by a mirror surface having high reflectance.

6. The lighting apparatus as set forth in claim 3,
   wherein said light source is a tube-like light source which is disposed so that an axis of said light source is parallel to a longitudinal direction of the side surface of said light emitting section, and
   said light transmitting section is formed so that a profile perpendicular to the axis of said light source is substantially a semi-circle having the side surface of said light emitting section as a part of a chord of the semi-circle.

7. A lighting apparatus comprising:
   a light emitting section in the shape of a flat plate having a light emitting surface on one side, said light emitting section being made from a light transmitting material;
   a light source disposed on an opposite side of said light emitting section with respect to said light emitting surface; and
   a light guiding section for guiding light from said light source into said light emitting section through a side surface of said light emitting surface,
   wherein said light guiding section further includes a light reflecting section for covering an outside surface of said light transmitting section except at least a portion facing said light source,
   wherein said light source is a tube-like light source which is disposed so that an axis of said light source is parallel to a longitudinal direction of the side surface of said light emitting section, and
   said light transmitting section is formed so that a profile perpendicular to the axis of said light source is substantially a trapezoid having the side surface of said light emitting section as a part of a base of the trapezoid.

8. The lighting apparatus as set forth in claim 7,
   wherein said light reflecting section has a reflecting corner with an interior angle of about 90 degrees at a position facing a non-parallel side of said light transmitting section having the substantially trapezoid profile.

9. The lighting apparatus as set forth in claim 8, further comprising a reflector for covering a periphery of said light source except a portion facing said light guiding section,
   wherein said reflector and said light reflecting section are formed as a single unit by the same material.

10. The lighting apparatus as set forth in claim 3,
    wherein said light source is a tube-like light source which is disposed so that an axis of said light source is parallel to a longitudinal direction of the side surface of said light emitting section, and
    said light transmitting section is formed so that a profile perpendicular to the axis of said light source is a substantially triangle having the side surface of said light emitting section as a part of one side of the triangle.

11. The lighting apparatus as set forth in claim 10,
    wherein said light reflecting section has a reflecting corner with an interior angle of about 90 degrees at a position facing either two equal sides of said light transmitting section having the substantially triangular profile.

12. The lighting apparatus as set forth in claim 11, further comprising a reflector for covering a periphery of said light source except a portion facing said light guiding section, wherein said reflector and said light reflecting section are formed as a single unit by the same material.

13. The lighting apparatus as set forth in claim 10, wherein said light transmitting section is formed so that a profile perpendicular to the axis of said light source is substantially an isosceles triangle having the side surface of said light emitting section as a part of a base of the isosceles triangle.

14. The lighting apparatus as set forth in claim 13, wherein said light reflecting section has a reflecting corner with an interior angle of about 90 degrees at a position facing either two equal sides of said light transmitting section having the substantially isosceles triangular profile.

15. The lighting apparatus as set forth in claim 14, further comprising a reflector for covering a periphery of said light source except a portion facing said light guiding section, wherein said reflector and said light reflecting section are formed as a single unit by the same material.

16. The lighting apparatus as set forth in claim 1, wherein said light guiding section includes a light transmitting section formed by a light transmitting material so as to lie in a bent shape from a side surface of said light emitting section to a position facing said light source; and a light-incidence end surface is formed at a position of said light transmitting section facing said light source, said light-incidence end surface being a plane which is substantially perpendicular to an opposite surface of said light emitting section with respect to said light emitting surface but slightly tilts with respect to the opposite surface in a direction going away from said light source.

17. The lighting apparatus as set forth in claim 16, wherein a tilt angle of said light-incidence end surface with respect to a normal line of said light emitting surface is within a range of from 2 degrees to 10 degrees.

18. The lighting apparatus as set forth in claim 1, wherein said light guiding section includes a light transmitting section formed by a light-transmitting material so as to lie in a bent shape from a side surface of said light emitting section to a position facing said light source, and said light transmitting section comprises a light-incidence end surface in the shape of a convex surface on which light from said light source is incident at a position facing said light source.

19. The lighting apparatus as set forth in claim 1, wherein said light guiding section includes a light transmitting section formed by a light-transmitting material so as to lie in a bent shape from a side surface of said light emitting section to a position facing said light source, and a light-incidence end surface formed at a position of said light transmitting section facing said light source, said light-incidence end surface being formed by a perpendicular surface which is substantially perpendicular to an opposite surface of said light emitting section with respect to said light emitting surface and an incline surface which tilts slightly with respect to the opposite surface in a direction going away from said light source, wherein said perpendicular surface is positioned closer to the opposite surface of said light emitting section than said inclined surface.

20. The lighting apparatus as set forth in claim 19, wherein a tilt angle of said inclined surface with respect to said perpendicular surface is within a range of from 2 degrees to 10 degrees.

21. A lighting apparatus comprising:

a light emitting section in the shape of a flat plate having a light emitting surface on one side, said light emitting section being made from a light transmitting material;

a light source disposed on an opposite side of said light emitting section with respect to said light emitting surface;

a light guiding section for guiding light from said light source into said light emitting section through a side surface of said light emitting surface, and a reflector for covering a periphery of said light source except a portion facing said light guiding section, wherein said light guiding section includes:

a light transmitting section formed by a light transmitting material to extend from a side surface of said light emitting section to a position facing said light source; and a light reflecting section for covering a periphery of said light transmitting section except at least a portion facing said light source, and wherein said reflector and said light reflecting section are formed as a single unit by the same material.

22. The lighting apparatus as set forth in claim 21, wherein said reflector is formed by a metal.

23. The lighting apparatus as set forth in claim 21, wherein said reflector is formed by a resin having high reflectance.

24. The lighting apparatus as set forth in claim 21, further comprising an electrode holding member for holding an electrode section of said light source, wherein said reflector and said electrode holding member are formed as a single unit.

25. The lighting apparatus as set forth in claim 1, further comprising a diffusing sheet, formed on said light emitting surface of said light emitting section, for diffusing light emitted from said light emitting surface.

26. A lighting apparatus comprising:

a light emitting section in the shape of a flat plate having a light emitting surface on one side, said light emitting section being made from a light transmitting material;

a light source disposed on an opposite side of said light emitting section with respect to said light emitting surface;

a light guiding section for guiding light from said light source into said light emitting section through a side surface of said light emitting surface, and a reflecting sheet, formed on an opposite surface of said light emitting section with respect to said light emitting surface, for moving light emitted from said light emitting section back into said light emitting section.

27. A display device incorporating the lighting apparatus set forth in claim 1 and a light-transmitting-type image display panel placed on a light emitting side of the light emitting section of said lighting apparatus, wherein said light source is disposed so that, when said light source is projected in a direction normal to the light emitting section, at least a portion of said light source is within a data display space R.

28. The display device as set forth in claim 27, further comprising at least one of a driving circuit for said image display panel and a control circuit for said light source, on a side of said light emitting section on which said light source is disposed.

* * * * *